US012280962B2

(12) United States Patent
Greyson et al.

(10) Patent No.: US 12,280,962 B2
(45) Date of Patent: Apr. 22, 2025

(54) CONVEYOR CONTROLLER WITH ANALYTICS SYSTEM

(71) Applicant: Bastian Solutions, LLC, Indianapolis, IN (US)

(72) Inventors: Tiffany Lee Greyson, Boise, ID (US); Samuel J. Osterhout, Indianapolis, IN (US); Benjamin Perry Baker, Indianapolis, IN (US); Adrian Rothenbuhler, Meridian, ID (US); Anton B. Eckerle, Fishers, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 55 days.

(21) Appl. No.: 18/302,937

(22) Filed: Apr. 19, 2023

(65) Prior Publication Data

US 2023/0382653 A1    Nov. 30, 2023

Related U.S. Application Data

(63) Continuation of application No. PCT/US2021/071934, filed on Oct. 20, 2021.
(Continued)

(51) Int. Cl.
*B65G 43/02* (2006.01)
*B65G 43/08* (2006.01)

(52) U.S. Cl.
CPC ............. *B65G 43/02* (2013.01); *B65G 43/08* (2013.01); *B65G 2203/0233* (2013.01);
(Continued)

(58) Field of Classification Search
CPC .................................................. B65G 43/02
See application file for complete search history.

(56) References Cited

U.S. PATENT DOCUMENTS

| 4,672,553 A | * | 6/1987 | Goldberg | G06Q 10/08 |
| | | | | 235/383 |
| 6,237,752 B1 | | 5/2001 | El-Ibiary | |
| | | (Continued) | | |

FOREIGN PATENT DOCUMENTS

| CN | 103180231 | * | 10/2011 | ............ B65G 43/06 |
| DE | 3813614 | * | 4/1988 | ............ B65G 43/02 |

OTHER PUBLICATIONS

PCT, Int. App. No. PCT/US2021/071934 International Search Report (ISR), 4 pages, Feb. 21, 2022.
(Continued)

*Primary Examiner* — Hongmin Fan
(74) *Attorney, Agent, or Firm* — Woodard, Emhardt, Henry, Reeves & Wagner, LLP

(57) ABSTRACT

A data analytics system has been developed for conveyor systems that helps to monitor items along conveyors as well as assist in monitoring the status or health of equipment of the conveyor. Tracking items in conveying systems within a facility can be difficult. Conveyed items can become jammed, lost, or even fall off the conveyor. Based on input from motors and sensors along the conveyor, the data analytics system is able to detect lost or jammed items. With input from the sensors, the data analytics system is also configured to detect equipment wear and damage. The data analytic system further aggregates data from the various conveyor systems to generate statistics as well as other information that can be used for modeling and simulating the conveyor system. The aggregate data can be used to generate measures such as travel efficiency analytics for reporting purposes.

32 Claims, 20 Drawing Sheets

Related U.S. Application Data

(60) Provisional application No. 63/198,455, filed on Oct. 20, 2020.

(52) U.S. Cl.
    CPC ............... *B65G 2203/0258* (2013.01); *B65G 2203/0275* (2013.01); *B65G 2203/044* (2013.01)

(56) References Cited

U.S. PATENT DOCUMENTS

| | | | |
|---|---|---|---|
| 8,284,993 B2 | 10/2012 | Taylor et al. | |
| 8,757,363 B2 | 6/2014 | Combs et al. | |
| 8,887,897 B2 | 11/2014 | Itoh et al. | |
| 9,227,791 B2 | 1/2016 | DePaso | |
| 10,173,841 B1* | 1/2019 | Ramalingam | H02K 11/27 |
| 10,984,378 B1* | 4/2021 | Eckman | G06K 19/06131 |
| 2001/0024609 A1 | 9/2001 | White et al. | |
| 2004/0016626 A1 | 1/2004 | Helgerson et al. | |
| 2005/0192704 A1 | 9/2005 | Wielebski et al. | |
| 2012/0048682 A1* | 3/2012 | Itoh | B65G 13/02 |
| | | | 198/780 |
| 2012/0175223 A1 | 7/2012 | Breen et al. | |
| 2020/0048011 A1* | 2/2020 | Harrison | B65G 45/16 |
| 2020/0095066 A1* | 3/2020 | Niu | B65G 43/08 |
| 2020/0247616 A1 | 8/2020 | Nitzberg | |
| 2020/0255226 A1 | 8/2020 | Danelski | |

OTHER PUBLICATIONS

PCT, Int. App. No. PCT/US2021/071934 Written Opinion (WO) of the International Searching Authority, 6 pages, Feb. 21, 2022.

* cited by examiner

CONVEYOR CONTROLLER WITH ANALYTICS SYSTEM

CROSS REFERENCE TO RELATED APPLICATIONS

This application is a continuation of International Patent Application Number PCT/US2021/071934, filed Oct. 20, 2021, which is hereby incorporated by reference. International Patent Application Number PCT/US2021/071934, filed Oct. 20, 2021, claims the benefit of U.S. Patent Application No. 63/198,455, filed Oct. 20, 2020, which are hereby incorporated by reference.

BACKGROUND

Conveyor systems are used in a wide variety of environments, such as in manufacturing and warehousing environments, to move, accumulate, and sort cartons, packages, and other items. Tracking items on a conveyor system within a facility can be a difficult proposition. Items can become jammed on the conveyor or even fall off the conveyor. As a result of damage or even routine use, components of the conveyor system will typically experience damage or wear such that the components need to be repaired or replaced. For example, motors of the conveyor system will eventually wear out and need to be replaced. Similarly, conveyor sensors, such as photoeyes, can become damaged or experience electrical failure so as to require recalibration or replacement of the sensors.

Thus, there is a need for improvement in this field.

SUMMARY

A unique controller card has been developed for use in conveyor systems. The controller card includes support for both 24V and 48V rollers without any change in the settings and/or configuration of the card. Similarly, the controller card further supports both older style alternating current (AC) systems, where a solenoid engages or disengages the conveyor from an AC motor used to power the conveyor, and newer direct current (DC) systems without requiring additional modifications. Some general components of the controller card include a sideband communication system, a data analytic system, and a roller detection system.

A unique data analytics system has been developed for conveyor systems that helps to track items along conveyors as well as assist in monitoring the status or health of conveyor equipment. As noted before, tracking items in conveyor systems within a facility can be difficult. Conveyed items can become jammed, lost, or even fall off the conveyor. Based on input from sensors along the conveyor, the data analytics system is able to detect lost or jammed items. With input from the sensors, the data analytics system is also configured to detect conveyor equipment wear and damage. For instance, photoeyes can become damaged or misaligned such that the system may be unable to detect conveyed items with the malfunctioning photoeyes. The data analytics system is able to detect these as well as other issues so as to facilitate recalibration, repair, or replacement of malfunctioning photoeyes as well as other sensors. Moreover, the data analytic system can be used to enhance conveyor performance. The data analytic system in one version aggregates data from the various conveyor systems to generate statistics as well as other information that can be used for modeling and simulating the conveyor system. With this information, actual data can be compared with simulated data to determine how improvements to the conveyor system can be made. The aggregate data can be used to generate measures such as travel efficiency analytics for reporting purposes.

In one approach, the data analytics system is centrally incorporated into a warehouse management system (WMS) that operates on one or more servers or other computer systems. The data analytics system gathers sensor and equipment data from the conveyor controllers via a network for the conveyor system. The data analytics system and corresponding monitoring techniques may be in the form of software, hardware, or a combination of both running on a centralized computer (e.g., WMS) or on multiple conveyor controllers. When an issue is detected, the data analytics system can alert the appropriate personnel and/or take other corrective actions.

In contrast to this centralized approach, the data analytics system in other examples uses a decentralized approach in which the individual conveyor controllers monitor sensor and other information to detect issues. In one version, the controllers take the form of control cards that are assigned the responsibility to monitor and control the operation of an individual conveyor zone. In one variation, the conveyor controller is in the form of a control card that is operatively connected to a motorized drive roller that controls movement along a conveyor zone, and the control card is further operatively connected to one or more photoeyes as well as other sensors in the conveyor zone. When the control card detects an issue in the conveyor zone, the control card in one example initiates an alert that is local to the conveyor zone and/or transmits the alert to the warehouse management system. With this decentralized or dispersed approach, the computing and monitoring requirements for the warehouse management system can be reduced. In other examples, a hybrid centralized-decentralized approach is used in which some of the monitoring functions are performed by the local controllers and others are performed by the warehouse management system.

In one implementation, a sideband communication system is used for communications between the conveyor control cards and communications with the warehouse management system. Electronic control units (ECUs) in the form of control cards control the operation of various zones of conveyors as well as communicate information about the conveyors and items transported by the conveyors. Typically, but not always, each card is assigned to control and monitor the operation of an individual conveyor zone. A typical conveyor zone in one example is powered by a motorized drive roller (MDR), but in other examples, the conveyor zone can be powered in other ways such as through a conventional electric conveyor motor. The control card is configured to control the operation of the motorized drive roller for a particular zone. In other variations, the control card is configured to control multiple motorized drive rollers for multiple zones. The control card is further operatively connected to sensors, like photoeyes, that are used to monitor the location of items transported in the conveyor zone as well as for other information.

In one form, the cards of adjacent conveyor zones are daisy chained together through a wired connection so as to facilitate communication with one another as well as with other systems like a programmable logic controller (PLC). The cards in one variation are connected together through RJ45 type Ethernet cables. In other examples, the cards can be operatively connected through wireless and/or wired type connections. Together, the cards form a controller area network (CAN). In addition to the standard CAN communication protocol, the control cards further communicate amongst themselves using a sideband communication protocol that is outside the realm of the standard CAN communication protocol. The sideband communication protocol allows the control cards to communicate with each other without interfering with normal network communications which in turn provides additional capabilities.

Via traditional controller connections, the control card in one form is configured to monitor the health or state of the motorized drive roller as well as other conveyor motors by measuring the electrical properties of the motorized drive roller. In other words, the control card is able to monitor the state of the motorized drive roller based on the normal communication and power wire connections between the control card and the motorized drive roller. This allows the status of the motorized drive roller (or other motors) to be monitored without the need for additional sensors. As will be explained below, this configuration also allows the control card to monitor the presence and other properties of items conveyed in the conveyor zone (e.g., weight and/or length of the items).

The data analytics system is able to monitor the status of the motorized drive roller and conveyed items by monitoring the electrical profile of the motorized drive roller or other conveyor motor. The electrical profile of the monitored roller through a number of electrical connections, such as via the power line to and/or from the motorized drive roller as well as via the ground connection to the motorized drive roller. The monitored electrical properties for example include electrical current, voltage, power, and/or phase. In one example, the control card monitors the current drawn during idling of the motorized drive roller. The current draw is constantly analyzed and compared to an expected value or an expected operational range (i.e., tolerance) based on design and/or historical information.

Once more, this technique allows the control card and/or data analytics system to evaluate motor health. For example, if the current drawn is not within a nominal value or range of what is expected, the control card sends an alert to a user interface (UI) or takes other corrective actions. The alert may inform a user that the conveyor motor is worn out or in need of maintenance. In a similar example, if a conveyed item exceeds the maximum weight limit of a conveyor zone and/or if the item is stuck in the conveyor zone the increase in current drawn by the motorized drive roller creates an alert. The alert may shut down the conveyor zone until the hazard is cleared by maintenance personnel.

Alternatively or additionally, the data analytics system is configured to monitor conveyor run time. In one example, a microcontroller and a clock in the control card times the conveyor run time. Monitoring the total run time of a conveyor zone allows for alerts to be sent when preventative maintenance is needed or scheduled. For example, a motor inspection may be needed after 1,000 hours of run time. When the clock reaches 1,000 hours, an alert is sent to a UI with instructions to complete maintenance. The maintenance intervals may be pre-set from the factory or based on the needs and usage of an end user.

The data analytics system further measures ambient warehouse temperature. Temperature information is monitored by a temperature sensor placed on a printed circuit board (PCB) of the control card. Temperature information may be used to determine ideal operating conditions. Alternatively or additionally, temperature information may be used to avoid failure or overheating of the control card or motor. For example, if the temperature value extends beyond a pre-set limit an alert is sent to a UI. The alert may indicate a need to check on the conveyor zone. In another example, when the temperature exceeds the pre-set limit, the conveyor zone automatically shuts down until the temperature falls to under the limit. With the control cards networked together, the warehouse management system is able to develop and provide a heatmap for the facility. This heatmap for example can be shared with facilities personnel so that appropriate actions can be taken to address temperature issues in the facility.

Mechanical wear issues and/or loose components are also monitored by the data analytics system. For example, an accelerometer on the PCB of the control card constantly monitors vibration. When the vibration value exceeds the expected values or control range limits, an alert is created and sent to a UI or other appropriate action is taken. In some cases, the alert continues until cleared by maintenance personnel. Alternatively or additionally, the conveyor zone may automatically shut down until the alert is cleared for safety reasons. Following a mechanical, electrical, and/or calibration change, the system is further configured in one variation to generate and send an alert to a UI and/or take other measures. For instance, the alert may include a summary of the changes made.

The data analytics system is further configured to detect package loss, tampering, and/or if sensor calibration is needed. As noted before, a sideband communication system in one example is used for communications between the conveyor control cards as well as the warehouse management system. The sideband communication system further allows scanner-less, zone-to-zone tracking of packages or other items along various conveyor sections or zones. The system in one form is configured to track packages in the conveyor zones by assigning virtual tracking numbers. Once identified, the package can be tracked along various conveyor zones without the need for rescanning because the control cards through the sideband communication protocol communicate the package identifiers when the packages are moved along and/or transferred from the control cards of adjacent conveyor zones.

For example, when a photoeye or other sensor detects a package or other item entering a conveyor zone, the control card controlling that conveyor zone generates an identification number or other unique signifier for the package. The control card over the CAN then transmits information about the package to one or more control cards that control downstream conveyor zones. For instance, the upstream control card transmits the identification number for the package, the time when the package arrived in the conveyor zone, conveyor velocity or speed in the zone, conveyor zone length, and/or estimated exit time for the package from the conveyor zone to the control card controlling a conveyor zone located immediately downstream from the upstream control card (or further downstream control cards).

The control card for the downstream conveyor zone is then able to estimate an expected arrival time for the package based on the received information from the upstream control card. If the photoeye or other sensor for the downstream conveyor zone does not detect the package when expected or within a tolerance range, this could signify several issues. For example, the package may have fallen off the conveyor or may be jammed on the conveyor. This delay in detecting the package in the downstream conveyor zone may be caused by malfunctions in the sensor used to sense the arrival of the package in the downstream conveyor zone. For instance, a photoeye or other sensor may be misaligned, damaged, and/or broken.

Upon determining the delay in receipt of the package, the downstream control card then initiates an appropriate corrective protocol. For instance, the downstream control card may send an alert to the appropriate personnel and/or system, and the alert may further provide information for diagnosing the issue. As an example, the alert may identify the package by a serial number and/or the system assigned package identifier. The package identification information is then used to track down or locate the missing or jammed package. The alert and/or other information may be transmitted to control cards for conveyor zones located further downstream. If a further downstream control card detects the arrival of the package, this indicates that the photoeye or sensor which did not detect the package may be malfunctioning. In response, this further downstream control card may provide an alert and/or instructions that the photoeye which did not detect the package may require recalibration, repair, and/or replacement.

Alternatively or additionally, the control card may be able to detect the presence, absence, weight, length, and/or other properties of a conveyed item without the need of extra sensors like photoeyes. As was described previously, the control card constantly monitors electrical properties of the motorized drive roller or other conveyor motors that provide the mechanical force for conveying the items. For instance, the control card in one variation monitors the current drawn by the motorized drive roller. With the measured electrical current, the control card is able to estimate motor torque values. The motor torque values in turn enable the control card to determine if a package is present or absent on a conveyor zone, without the use of a photoeye or other sensor. Similarly, the magnitude of the torque or electrical signal is used to estimate the weight of the package.

The control card in further examples uses current spikes from the motorized drive roller to determine when a conveyed item is discharged from the conveyor zone. As noted before, the control card in one form includes a clock. As a result, the control card is configured to time the duration a particular item is conveyed on the zone. With this duration, conveyor velocity, and other information, the control card calculates or estimates the length of the conveyed item. As should be recognized, this technique may further be used to detect package jams, stalls, and/or create trend information. The trend information may be used to create an advanced warning configured to warn of upcoming bottlenecks, mechanical issues, and/or other issues. This technique further can be used in conjunction with the above-described techniques for detecting photoeye or other sensor malfunctions. For instance, the motorized drive roller in one form acts as a backup sensor for a photoeye in a conveyor zone. Any discrepancies between the conditions sensed by the motorized drive roller and photoeye may cause the control card to take corrective action such as by issuing an alert.

In another example, data provided by the sensors and control cards is compiled and utilized to build a detailed schematic or simulated warehouse environment based on actual implementation. For example, detailed data from the conveyor card including throughput, package movement and transition timing, conveyor failure, total run times, package counts, package spacing, package weights, lost time, and/or other detailed information is uploaded to or aggregated on the warehouse management system and/or a remote server. In some cases, the server is remote from the facility housing the conveyor system. The data generated from the real-life warehouse environment is then downloaded from the server and used to create a simulated warehouse. The simulated warehouse may be used to further improve designs of conveyor operating systems.

In another aspect, package travel efficiency data is recorded and saved to memory on the control card. The efficiency data may be reviewed by a warehouse supervisor or team weekly, monthly, quarterly, and/or yearly to determine if the conveyor system is working as efficiently as possible. Based on the data, changes may be made to the conveyor system to create a more efficient and user-friendly environment. For example, these changes can include increasing conveyor belt speeds and/or creating new maintenance objectives.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including conveyor system.

Aspect 3 generally concerns the system of any previous aspect including a conveyor.

Aspect 4 generally concerns the system of any previous aspect in which the conveyor system including a conveyor.

Aspect 5 generally concerns the system of any previous aspect in which the data analytics system configured to monitor conveyor status of the conveyor system.

Aspect 6 generally concerns the system of any previous aspect in which the conveyor system includes a conveyor controller that controls a conveyor zone.

Aspect 7 generally concerns the system of any previous aspect in which the conveyor controller includes a controller card.

Aspect 8 generally concerns the system of any previous aspect in which the conveyor zone includes a conveyor motor that provides mechanical power for moving one or more items along the conveyor zone.

Aspect 9 generally concerns the system of any previous aspect in which the conveyor motor includes a motorized drive roller.

Aspect 10 generally concerns the system of any previous aspect in which the conveyor controller is configured to measure an electrical property of the conveyor motor to determine the conveyor status.

Aspect 11 generally concerns the system of any previous aspect in which the electrical property includes an electrical profile.

Aspect 12 generally concerns the system of any previous aspect in which the electrical profile includes a current spike.

Aspect 13 generally concerns the system of any previous aspect in which the electrical profile includes duration of the current spike.

Aspect 14 generally concerns the system of any previous aspect in which the electrical profile is indicative of item weight.

Aspect 15 generally concerns the system of any previous aspect in which the electrical property includes current drawn by the conveyor motor.

Aspect 16 generally concerns the system of any previous aspect in which the electrical property of the conveyor motor is indicative of item weight.

Aspect 17 generally concerns the system of any previous aspect in which the electrical property of the conveyor motor is indicative of motor wear.

Aspect 18 generally concerns the system of any previous aspect in which the electrical property of the conveyor motor is indicative of item jamming.

Aspect 19 generally concerns the system of any previous aspect in which the conveyor controller is configured to measure an electrical property of the conveyor motor when idle to determine the conveyor status.

Aspect 20 generally concerns the system of any previous aspect in which the conveyor controller includes a temperature sensor.

Aspect 21 generally concerns the system of any previous aspect in which the data analytics system is configured to generate a heat map based on temperature data from temperature sensor of the conveyor controller.

Aspect 22 generally concerns the system of any previous aspect in which the conveyor controller includes an accelerometer configured to measure conveyor equipment vibrations in the conveyor zone.

Aspect 23 generally concerns the system of any previous aspect in which the conveyor controller includes a clock.

Aspect 24 generally concerns the system of any previous aspect in which the clock is configured to measure item travel time in the conveyor zone.

Aspect 25 generally concerns the system of any previous aspect in which the clock is configured to measure conveyor motor run time.

Aspect 26 generally concerns the system of any previous aspect in which the conveyor zone includes a sensor operatively connected to the conveyor controller to monitor for presence of one or more items in the conveyor zone.

Aspect 27 generally concerns the system of any previous aspect in which the sensor includes a photoeye.

Aspect 28 generally concerns the system of any previous aspect in which the conveyor controller is configured to communicate with a downstream conveyor controller that controls a downstream conveyor zone.

Aspect 29 generally concerns the system of any previous aspect in which the downstream conveyor controller is configured to determine a malfunction in the conveyor system upon detection of an undetected item in the downstream conveyor zone.

Aspect 30 generally concerns the system of any previous aspect in which the malfunction includes misalignment of the sensor.

Aspect 31 generally concerns the system of any previous aspect in which the malfunction includes item loss.

Aspect 32 generally concerns the system of any previous aspect in which the malfunction includes item jamming.

Aspect 33 generally concerns the system of any previous aspect in which the malfunction includes equipment malfunction.

Aspect 34 generally concerns the system of any previous aspect in which the conveyor controller is configured to track an item in the conveyor zone without a sensor.

Aspect 35 generally concerns the system of any previous aspect in which the conveyor controller tracks the item base on an electrical property of a conveyor motor for the conveyor zone.

Aspect 36 generally concerns the system of any previous aspect in which the conveyor controller is configured to assign an identifier for the item and transmit the identifier to a downstream conveyor controller.

Aspect 37 generally concerns the system of any previous aspect in which the data analytics system is configured to generate an alert based on the conveyor status.

Aspect 38 generally concerns the system of any previous aspect in which the alert includes a message about one or more changes to the conveyor system.

Aspect 39 generally concerns the system of any previous aspect in which the changes include a mechanical change.

Aspect 40 generally concerns the system of any previous aspect in which the changes include an electrical change.

Aspect 41 generally concerns the system of any previous aspect in which the changes include recalibration.

Aspect 42 generally concerns the system of any previous aspect in which the data analytics system is configured to generate information for a simulation of the conveyor system.

Aspect 43 generally concerns the system of any previous aspect in which the data analytics system is configured to provide a comparison between the simulation and actual implementation of the conveyor system.

Aspect 44 generally concerns the system of any previous aspect in which the data analytics system is implemented as software, firmware, and/or hardware on a conveyor controller.

Aspect 45 generally concerns the system of any previous aspect in which the data analytics system is implemented as software, firmware, and/or hardware on a warehouse management system.

Aspect 46 generally concerns the system of any previous aspect in which the conveyor status includes equipment wear.

Aspect 47 generally concerns the system of any previous aspect in which the conveyor status includes item weight.

Aspect 48 generally concerns the system of any previous aspect in which the conveyor status includes conveyor run time.

Aspect 49 generally concerns the system of any previous aspect in which the conveyor status includes temperature.

Aspect 50 generally concerns the system of any previous aspect in which the conveyor status includes tamper detection.

Aspect 51 generally concerns the system of any previous aspect in which the conveyor status includes item loss detection.

Aspect 52 generally concerns the system of any previous aspect in which the conveyor status includes photoeye recalibration.

Aspect 53 generally concerns the system of any previous aspect in which the data analytics system is configured to provide package travel efficiency analytics.

Aspect 54 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
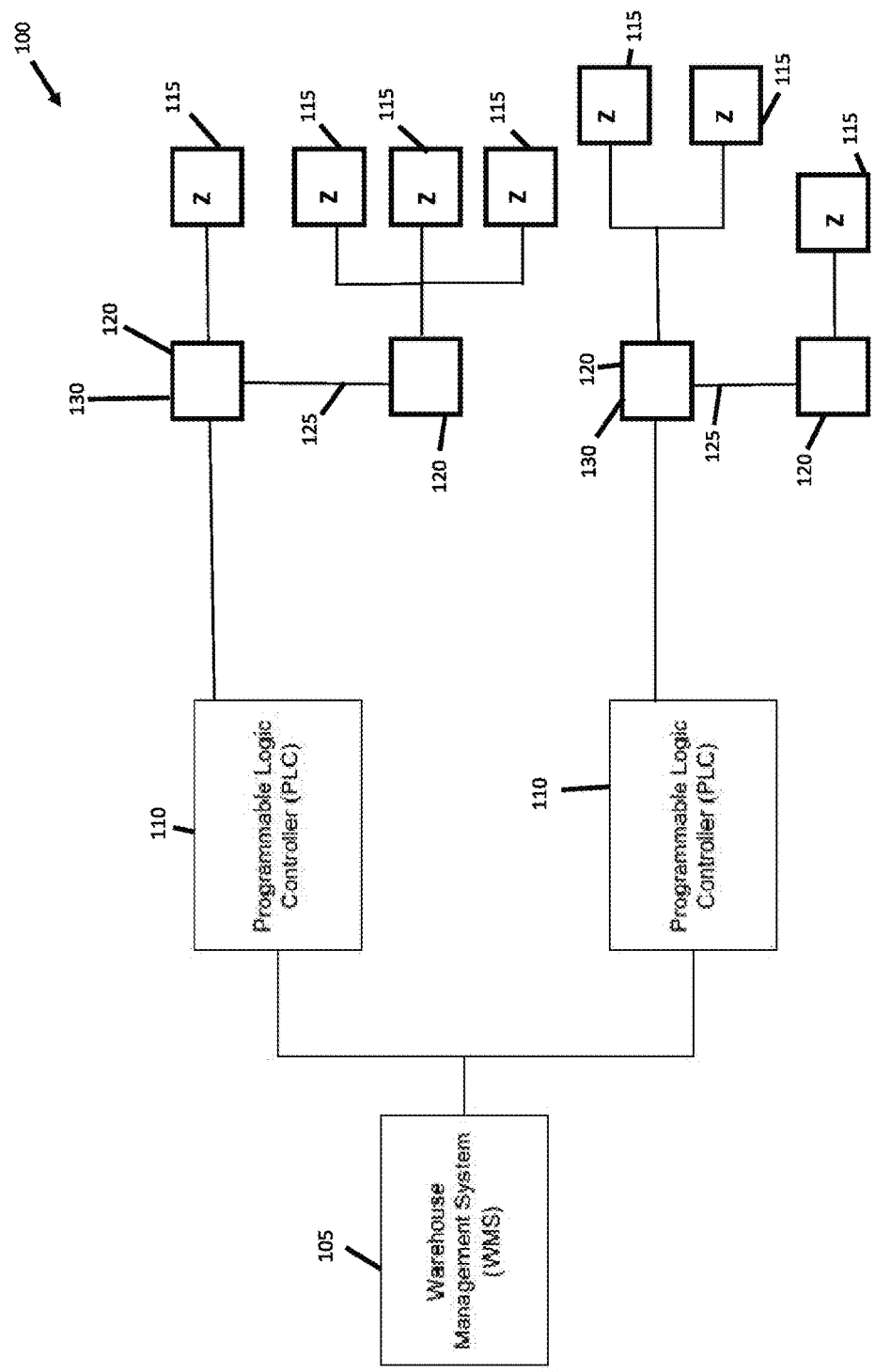
FIG. 1 is a block diagram of a conveyor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

One example of a conveyor system 100 that addresses the above-mentioned issues as well as other issues is illustrated in FIG. 1. As shown, the conveyor system 100 includes a warehouse management system (WMS) 105 for monitoring and/or controlling the flow of packages or other items within a facility such as a warehouse or manufacturing plant. The conveyor system 100 further includes one or more programmable logic controllers (PLCs) 110 operatively connected to the warehouse management system 105 such as via a wired and/or wireless connection. In other embodiments, the programmable logic controllers 110 may be replaced with a robot management system. The robot management system is constructed to take over operation of the conveyor system 100 from the programmable logic controllers 110. Each programmable logic controller 110 is configured to monitor and/or control the operation of conveyor equipment within one or more conveyor zones 115. In the illustrated example, the conveyor zones 115 each have a controller card 120 configured to control and/or monitor the operation of conveyor equipment within their respective conveyor zones 115.

The controller cards 120 are daisy-chained together through a physical, wired connection in one example. As can be seen in some configurations, each of the controller cards 120 that are daisy-chained together are able to control one or more conveyor zones 115. In one example, each controller card 120 controls a single conveyor zone 115, but in other examples, a single controller card 120 may control two or more conveyor zones 115. As can be seen in the illustrated example, a combination approach is used where some of the controller cards 120 control a single conveyor zone 115 and other controller cards 120 control multiple conveyor zones 115. The controller cards 120 in other configurations shown in FIG. 1 are daisy-chained across multiple conveyor zones 115. In the illustrated example, the controller cards 120 are operatively connected in a serial manner via one or more communication cables 125. In one variation, the communication cable 125 is in the form of an Ethernet type cable. As should be appreciated, an Ethernet cable commonly (but not always) is in the form of a cable containing twisted pairs of wires, such as a category 5 or 6 cable, with 8 position 8 contact (8P8C) modular connectors usually at both ends that are commonly referred to as registered jack 45 (RJ45) connectors. The RJ45 connectors are typically, but not always, plugged into a corresponding RJ45 plug to facilitate communication between the connected devices.

Together, the controller cards 120 form a controller area network (CAN) or local area network (LAN). In addition to the standard CAN communication protocol, the controller cards 120 further communicate amongst themselves using a sideband communication protocol that is outside the realm of the standard CAN communication protocol. The sideband communication protocol allows the controller cards 120 to communicate with each other without interfering with normal network communications which in turn provides additional capabilities.

In some types of communication standards, the full capacity of the physical communication channel is not used. For example, with the 10BASE-T or 100BASE-TX protocols, an Ethernet cable with the TS568A or T568B connector wiring assignments, only connector pins 1, 2, 3, and 6 (e.g., striped white/green, solid green, white/orange, and solid orange wires) of the RJ45 connector are generally used for communications. On the other hand, pins 4 and 5 (i.e., solid blue and striped white/blue wires) as well as pins 7 and 8 (striped white/brown and solid brown wires) are generally not used to communicate data.

The controller cards 120 use this untapped or unused channel capacity in the Ethernet cable to form a sideband communication channel or network that allows the controller cards 120 to communicate with one another along the chain of controller cards 120. In one version, one or more of the unused twisted pair wires or pins (e.g., pins 4 and 5) within an Ethernet cable form a sideband communication channel that facilitates sideband communication between the controller cards 120 using a serial communication protocol such as via universal asynchronous receiver-transmitter (UART) hardware. In one particular example, the communication cables 125 are in the form of Ethernet cables in which pins 4 and 5 of the RJ45 connectors are used to communicate using the RS-485 standard for robust serial communications. In other variations, pins 7 and 8 are alternatively or additionally used for the sideband communication between the controller cards 120 via the RS-485 standard. The RS-485 communication standard is especially helpful for sideband communications in the conveyor system 100 because the conveyor system 100 is typically used in electrically noisy environments like warehouses and manufacturing plants. The communications on this sideband communication channel do not interfere with the normal Ethernet communications between the conveyor zones 115 and controller cards 120 on the other wires within the communication cable 125 (e.g., RJ45 connector pins 1, 2, 3, and 6).

It should be recognized that this sideband communication technique can be used with other types of communication cables 125 so long as channel space is available for sideband communications. For example, while 8P8C modular connectors and paired wires were described above, it should be recognized that the sideband communication technique can be used in different designs that have more or less wires/pins. For instance, the sideband can be used in communication cables 125 that have 6 pin 6 connector (6P6C) type modular connectors (e.g., RJ11, RJ14, or RJ25 connectors) or 10 pin 10 connector (10P10C) type modular connectors (e.g., RJ50 connectors). Other examples of the communication cables 125 do not require twisted or untwisted wire pairs. For instance, the communication cable 125 can include a coaxial cable or fiber optic cable, and the unused communication channel space on the coaxial or fiber optic cable is used for sideband communications between the controller cards 120. In other variations, a wireless communication network (e.g., Wi-Fi) is used for communications between the controller cards 120, and some or all of the unused spectrum or channels is used to form a sideband communication network between the controller card 120.

Again, as can be seen in FIG. 1, the controller cards 120 are daisy-chained together with the communication cables 125. At the end of this chain, proximal to the programmable logic controller 110, the controller card 120 at this position is designated the chain master 130 (or gateway) through which communications to and from the programmable logic controller 110 and the controller cards 120 within the conveyor zone 115 are funneled.

The programmable logic controllers 110 through the CAN are further adapted to remotely configure or reconfigure the controller card 120. For instance, each controller card 120 in one version has inputs and outputs that are reconfigurable. The programmable logic controller 110 in one form is able to reprogram or override the default settings of the inputs and/or outputs of the controller card 120. The programmable logic controllers 110 in one variation reprogram the controller card 120 to send a notification over the CAN to the programmable logic controllers 110 when one or more conditions occur. For example, the controller card 120 can be programmed to send a notification when a conveyor zone 115 is empty and/or when an attached photoeye senses the presence or absence of an object. The programmable logic controllers 110 in one form treat the input/output of the controller card 120 as a gate. In other words, the programmable logic controller 110 is able to reconfigure the controller card 120 so that the card is able to act as a remote sensor without the need for installing a separate output extender.

Figure 2:
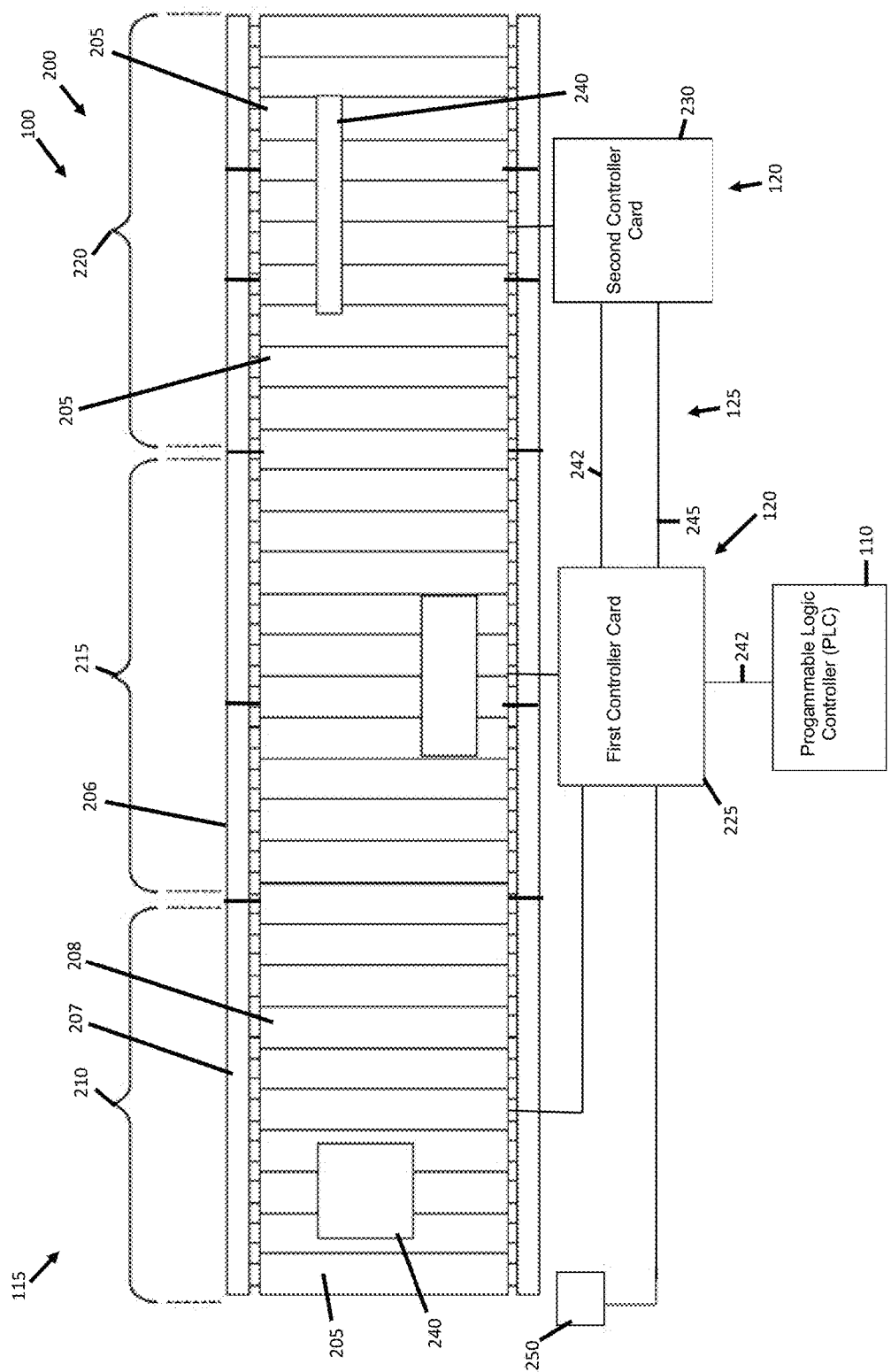
FIG. 2 is a block diagram of a conveyor system.

One example of a conveyor system 200 that is used with the conveyor system 100 is depicted in FIG. 2. As shown, the conveyor system 200 includes one or more conveyors 205 organized into various conveyor zones 115. In the illustrated example, the conveyor 205 is a roller type conveyor, but it should be recognized that the conveyor 205 can include other types of conveyors like belt conveyors and slat conveyors. As depicted, each conveyor 205 includes a frame 206 with opposing rails 207 that support rollers 208 and are configured to convey or otherwise transport various packages or other items. The rollers 208 of the conveyor 205 for instance can include powered rollers, unpowered rollers, or any combination thereof.

The conveyors 205 are organized into the various conveyor zones 115. In the depicted example, the conveyor zones 115 include a first zone 210, a second zone 215, and a third zone 220, but it should be recognized that other configurations of the conveyor system 100 can include more or less conveyor zones 115. Each conveyor zone 115 can include one or more of the conveyors 205. Some or all of the conveyor zones 115 can include a single conveyor 205 in certain configurations, and the conveyor zones 115 in other configurations can have multiple conveyors 205.

As noted above with respect to FIG. 1, the controller cards 120 in the conveyor zones 115 are daisy-chained together via the individual communication cables 125. The daisy-chained controller cards 120 can control a single conveyor zone 115 or can control multiple conveyor zones 115. The controller card 120 in the chain connected to the programmable logic controller 110 is once more the chain master 130 for the chain of controller cards 120. The chain master 130 typically, but not always, is connected to the programmable logic controller 110 using the same type of communication cable 125 connecting the controller cards 120 together. For instance, the chain master 130 in one form is connected to the programmable logic controller 110 via an Ethernet cable. In one variation, the sideband communication along the communication cable 125 is limited to communications between the controller cards 120, and the controller cards 120 do not communicate with the programmable logic controller 110 via the sideband communication link. In other variations, the controller cards 120 can communicate with the programmable logic controller 110 via a sideband communication link.

The controller cards 120 are operatively connected to the conveyors 205, sensors, equipment, and/or other devices within the corresponding conveyor zone 115. In turn, the controller cards 120 are able to monitor the operation of and control the conveyors 205 within the particular conveyor zone 115. For instance, the conveyor zone 115 can be used to instruct one or more rollers 208 within the conveyor zone 115 to move or stop. For explanation purposes, the controller card 120 controlling a particular conveyor zone 115 may be identified by the zone number. For example, the controller card 120 controlling the first zone 210 may be referred to as a first controller card 225, and the controller card 120 controlling the third zone 220 may be referred to as a second controller card 230. With the controller cards 120, the warehouse management system 105 and/or programmable logic controller 110 is able to monitor and control movement of one or more packages 240 or other items on the conveyors 205 in the various conveyor zones 115.

As mentioned previously, the controller cards 120 are typically connected via the communication cables 125, and the communication cable 125 has a main/primary CAN communication link or main communication channel 242 and a sideband communication channel 245. The sideband communication channel 245 enables the controller cards 120 to exchange information relating to status, package location, and/or other pertinent data without interrupting communications along the main communication channel 242. In one example, the communication cables 125 are in the form of Ethernet cables using the TS568A (or T568B) connector wiring (pin) assignments. In this example, the main communication channel 242 uses the 10BASE-T or 100BASE-TX protocols such that connector pins 1, 2, 3, and 6 of the RJ45 connector along with the corresponding wires form the main communication channel 242. The warehouse management system 105 and/or programmable logic controller 110 communicate with the controller cards 120 using the 10BASE-T or 100BASE-TX protocols along this primary, main communication channel 242. In this example, pins 4 and 5 of the RJ45 connector and the corresponding wires in the communication cable 125 form the sideband communication channel 245 along which the controller cards 120 are able to communicate with each other using the RS485 serial communication protocol.

Once more, it should be recognized that other types of communication protocol can form the main communication channel 242 and sideband communication channel 245. For instance, when a wireless communication network is used for communications between the controller cards 120, the carrier can be used for the main communication channel 242, and the upper sideband (USB) and/or lower sideband (LSB) can be used for the sideband communication channel 245.

Other types of devices or sensors besides the conveyor 205 can be operatively connected to the controller cards 120. In the illustrated example of FIG. 2, the conveyor system 200 has a photoeye 250 that is operatively connected to one of the controller cards 120. The photoeye 250 detects the presence of the package 240 in a particular conveyor zone 115. The photoeye 250 then shares the package 240 information with the controller card 120 within the proper conveyor zone 115. To track the progress of the package 240, the first controller card 225, which controls the first zone 210 and the second zone 215, transmits a package identifier via the sideband communication channel 245 to the second controller card 230 as the package 240 moves from the second zone 215 to the third zone 220. This process continues downstream until reaching the end of the conveyor system 200.

Figure 3:
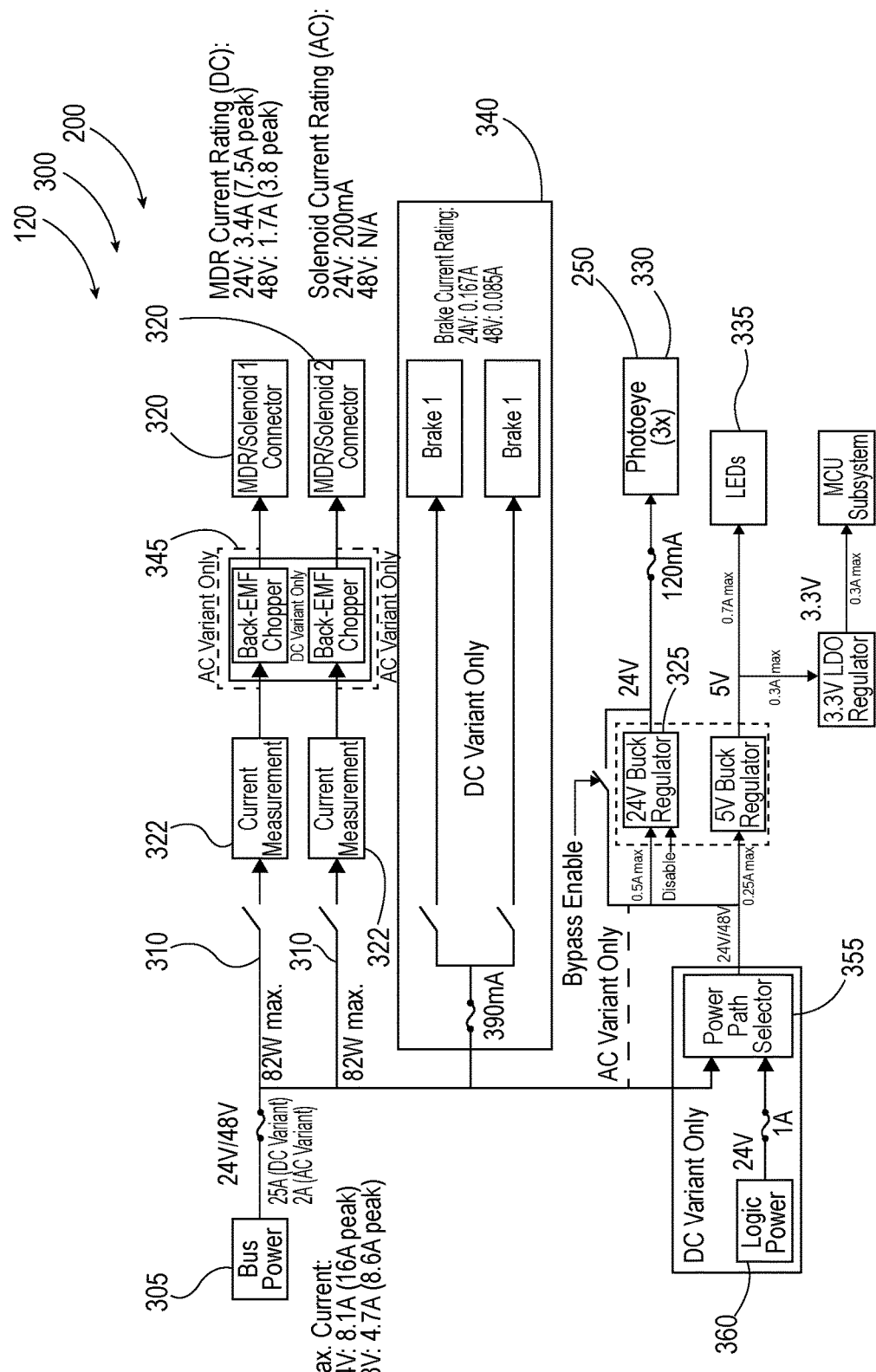
FIG. 3 is a block diagram of a power system.

As shown in FIG. 3, each controller card 120 of the conveyor system 200 includes a power system 300 for supplying and controlling power to the controller card 120 as well as other equipment such as the conveyor 205 and the rollers 208. The power system 300 includes bus power 305. In some examples, the bus power 305 is 24 volts (V). However, in other examples the bus power 305 is 48V. The bus power 305 flows through a series of parallel paths where power flow is controlled via a number of switches 310. The switches 310 typically function in an open/closed manner where an open switch does not allow power flow and a closed switch does allow power flow.

In an alternating current (AC) system the power continues to flow into a conveyor power connector 320 that for example supplies power to an electrically powered component of the conveyor 205. For instance, the conveyor power connector 320 may power a motorized drive roller (MDR), a solenoid, and/or another device requiring AC power to operate. The AC power may also flow to one or more photoeyes 250. Current drawn to power the components connected to the conveyor power connector 320 is measured via one or more current sensors 322.

In a direct current (DC) system the power is changed from fixed DC to variable DC power. Typically, this is done via a chopper 345 integrated into the system upstream of the conveyor power connector 320. A brake 340 is also included in the DC system. The DC system may also include logic power 350 configured to power the control logic of the conveyor system 200. The logic power 350 may also run into a power path selector 355, which sends the DC power through one or more regulators 325. From the regulators 325 power may flow into one or more photoeyes 330 and/or one or more light emitting diodes 335.

Figure 4:
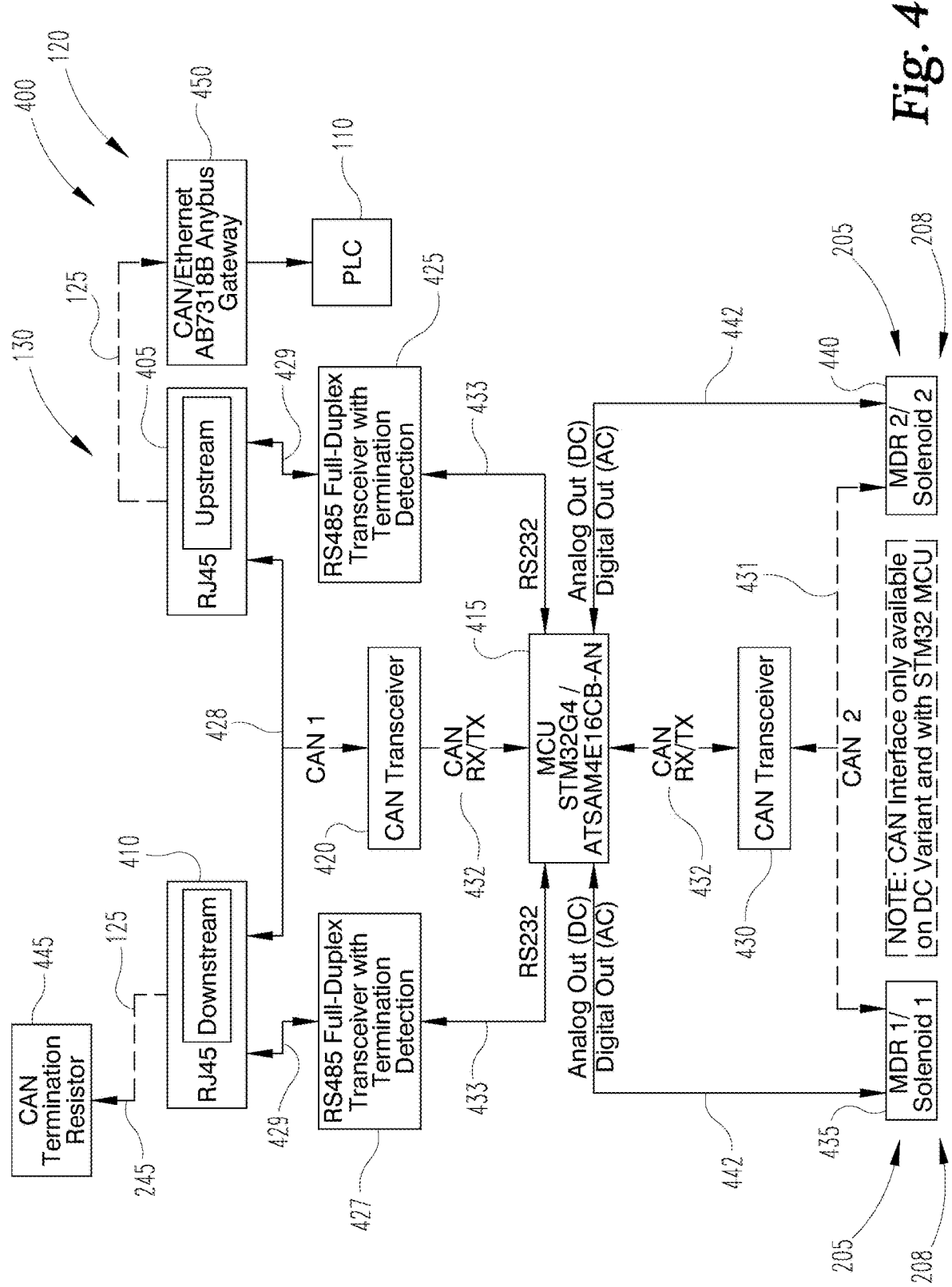
FIG. 4 is a block diagram of a communication system.

Turning to FIG. 4, an example of a communication system 400 for the controller card 120 is shown. The communication system 400 includes an upstream port 405 and a downstream port 410. Generally, the upstream port 405 of a controller card 120 is connected to the downstream port 410 of a preceding controller card 120 or the programmable logic controller 110. Likewise, the downstream port 410 is connected to the upstream port 405 of following controller cards 120 or to generally nothing. In one example, the upstream port 405 and downstream port 410 are in the form of RJ45 type sockets configured to receive corresponding connector plugs of the communication cable 125 in the form of an Ethernet cable. The connections at the upstream port 405 and downstream port 410 can be configured differently in further variations. In still yet other examples, the connections may be wireless.

The upstream port 405 and downstream port 410 communicate with a motor control unit 415 via a first network carrier transceiver 420 along with an upstream sideband transceiver 425 and a downstream sideband transceiver 427. In the illustrated example, the first network carrier transceiver 420 is in the form of a controller area network (CAN) transceiver that transmits and receives communications from the programmable logic controllers 110 and other controller cards 120 along the main communication channel 242 of the communication cable 125. As shown, the first network carrier transceiver 420 is operatively connected to the upstream port 405 and downstream port 410 via the first carrier network connection 428. The upstream sideband transceiver 425 and downstream sideband transceiver 427 are operatively connected to the upstream port 405 and downstream port 410, respectively, via one or more sideband connections 429. The upstream sideband transceiver 425 receives and transmits sideband communications from controller cards 120 located upstream from the current controller card 120 via the upstream port 405, and the downstream sideband transceiver 427 receives and transmits sideband communications from controller cards 120 located downstream from the current controller card 120. As should be appreciated, the sideband communications via the upstream sideband transceiver 425 and downstream sideband transceiver 427 can generally occur without interfering with normal communications via the first network carrier transceiver 420.

Returning to the previously described Ethernet example where the communication cables 125 are in the form of Ethernet cables using the TS568A (or T568B) connector pin assignments, the main communication channel 242 uses the 10BASE-T or 100BASE-TX protocols such that connector pins 1, 2, 3, and 6 of the RJ45 connector along with the corresponding wires form the main communication channel 242. Via pins 1, 2, 3, and 6 of the upstream port 405 and/or the downstream port 410, the first network carrier transceiver 420 communicates with the programmable logic controller 110 and/or other controller cards 120 using the Ethernet protocols along the primary, main communication channel 242 of the communication cable 125. In this same example, pins 4 and 5 of the RJ45 connector and the corresponding wires in the communication cable 125 form the sideband communication channel 245 along which the controller cards 120 are able to communicate with each other using the RS485 serial communication protocol.

As depicted, the motor control unit 415 is operatively connected to the first network carrier transceiver 420, upstream sideband transceiver 425, and downstream sideband transceiver 427 so as to be able to communicate along the main communication channels 242 and sideband communication channels 245 of the communication cables 125. The motor control unit 415 is further operatively connected to other components in the corresponding conveyor zone 115. For instance, the motor control unit 415 is operatively connected to a second network carrier transceiver 430 that communicates with components of the conveyor zone 115 (e.g., the conveyor 205, photoeye 250, etc.) through a conveyor or second carrier network 431. Both the first network carrier transceiver 420 and second network carrier transceiver 430 are operatively connected to the motor control unit 415 through motor control unit carrier links 432. The upstream sideband transceiver 425 and downstream sideband transceiver 427 are operatively connected to the motor control unit 415 via one or more motor control unit sideband links 433.

With continued reference to FIG. 4, the motor control unit 415 via the second carrier network 431 is operatively connected to a first electrical device 435 and a second electrical device 440. Alternatively or additionally, the motor control unit 415 is directly connected to the first electrical device 435 and second electrical device 440 via one or more direct conveyor connections 442. The direct conveyor connections 442 can include digital or analog type connections. The first electrical device 435 and second electrical device 440 can include rollers 208 in the form of motorized drive rollers (MDRs), solenoids, or other equipment and/or sensors (e.g., photoeyes 250) associated with the conveyors 205. Through the second network carrier transceiver 430 and/or direct conveyor connection 442, the motor control unit 415 is able to monitor and control the rollers 208. For instance, the motor control unit sideband link 433 is able to power and control the speed and operation of MDRs in the conveyors 205 as packages 240 are transported on the conveyors 205. Information from the conveyors 205 as well as sensors associated with the conveyors 205 is processed via the motor control unit 415 and communicated to the programmable logic controllers 110 and/or controller cards 120 via the main communication channels 242 and/or sideband communication channels 245. For instance, the motor control unit 415 can be used to track packages 240 as the packages 240 travel on and between various conveyor zones 115.

Through the upstream sideband transceiver 425, the controller card 120 is able to determine the relative chain location of the controller card 120 along a given daisy-chained set of controller cards 120. The sideband communication capability facilitates in determining whether the controller card 120 is the first controller card 120 in the chain, the last controller card 120 in the chain, or somewhere in the middle.

Looking at FIG. 4, a termination resistor 445 in one example is connected to the downstream port 410 when the controller card 120 is the last one in the chain. By measuring the resistance (or voltage) of the termination resistor 445 (or the sideband communication channel 245 at the downstream port 410), the motor control unit 415 of the controller card 120 is able to determine that the controller card 120 is the last one in the chain. For instance, the termination resistor 445 can have a high resistance which indicates that no downstream controller card 120 is connected to the downstream port 410. On the other hand, when the resistance is within a range that indicates a downstream controller card 120 is connected, then the controller card 120 determines the controller card 120 is not the last one. Alternatively or additionally, when nothing is connected to the sideband communication channel 245 at the downstream port 410 (i.e., open contact), the open signal or very high resistance signifies that no downstream controller card 120 is connected, and the current controller card 120 is the last one in the chain. Returning to the previous Ethernet example, when a high resistance or an open condition is detected at pins 5 and 6 of the RJ45 socket at the downstream port 410, the controller card 120 determines the controller card 120 is the last one in the chain. Alternatively or additionally, the downstream sideband transceiver 427 can broadcast a ping or request a response via the downstream port 410 on the sideband communication channel 245. If no response is received, the controller card 120 is the last one on the chain. Conversely, if a response is received, then the controller card 120 is not the last one in the chain.

In certain cases, the programmable logic controllers 110 of the controller card 120 are directly connected to the upstream port 405 via one of the communication cables 125. Sometimes however, as is shown in FIG. 4, the chain master 130 is indirectly connected to the programmable logic controller 110 through a CAN gateway 450. In either case, the controller card 120 can determine if the controller card 120 is the first one in the chain, or the chain master 130, by communicating via the upstream port 405. For instance, the first network carrier transceiver 420 of the controller card 120 can ping or request a response from the programmable logic controller 110 by communicating over the main communication channel 242 via the upstream port 405. If a response from the programmable logic controller 110 is received, the controller card 120 is the chain master 130. Conversely, when no response is received from the programmable logic controller 110, the controller card 120 is not the first one in the chain. Alternatively or additionally, the upstream sideband transceiver 425 can send a signal (or measure resistance like before) along the sideband communication channel 245 to determine whether another controller card 120 is located upstream. If the signal or measured resistance (or voltage) is indicative of no connection, the controller card 120 infers the controller card 120 is the chain master 130.

The controller card 120 is also configured to determine when the controller card 120 is not installed or not properly installed. For example, using the techniques described above, when the controller card 120 detects that the controller card 120 is not connected at the upstream port 405 and downstream port 410, then the controller card 120 is considered uninstalled or not connected.

Figure 5:
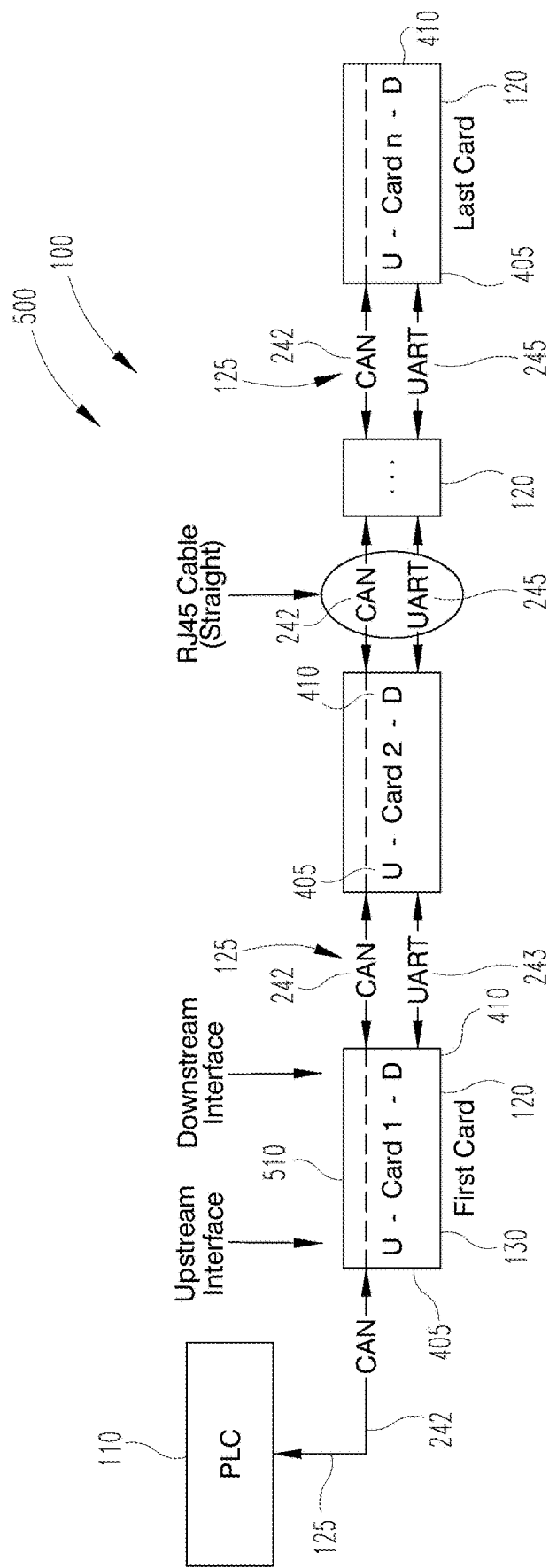
FIG. 5 is a block diagram of a sideband communication system.

One example of a sideband communication system 500 that can be incorporated into the conveyor system 100 is illustrated in FIG. 5. As mentioned previously, the controller card 120 communicates via the sideband communication system 500. The controller cards 120 include a first controller card 510 and a second controller card 520. The first controller card 510 and second controller card 520 are once more operatively connected via the communication cable 125. As noted before, the communication cable 125 includes the main communication channel 242 and the sideband communication channel 245. In the illustrated example, the main communication channel 242 facilitates communication via a controller area network (CAN) type protocol, and the sideband communication channel 245 facilitates communication using a universal asynchronous receiver-transmitter (UART) type protocol.

In this example, the first controller card 510 acts as the chain master 130. The programmable logic controller 110 is operatively connected to the upstream port 405 of the first controller card 510 via the communication cable 125. The first controller card 510 receives a command from the programmable logic controllers 110 via the main communication channel 242 of the communication cable 125. Through the communication cable 125, the downstream port 410 of the first controller card 510 is connected to the upstream port 405 of the second controller card 520. The first controller card 510 passes the command to the next (downstream) second controller card 520 through the communication cable 125. Subsequent downstream controller cards 120 are connected in a similar fashion and communicate in a similar fashion. In one form, the connection of the downstream port 410 of the first controller card 510 to the upstream port 405 of the second controller card 520 is via a RJ45 type ethernet cable. Once more, other types of connections can be used in other examples.

The sideband communication system 500 of the conveyor system 100 is configured to allow the controller cards 120 to automatically self-identify such as during initial installation, replacement, and/or general maintenance. The status or identity of the controller card 120 can be determined in a number of ways. As explained above, the controller card 120 can determine the relative location of the controller card 120 in the chain of controller cards 120 in several ways. Based on this determination of relative location, the controller card 120 can initiate the self-addressing or identification process. For example, if the controller card 120 does not sense a connection or signal on the sideband communication channel 245 at the upstream port 405 of the controller card 120 where the communication cable 125 for an upstream controller card 120 is normally connected, the controller card 120 can self-identify as being the first card in the daisy-chain (e.g., the chain master 130). In an alternative or additional variation, the chain master 130 or first controller card 510 self-identifies by detecting the programmable logic controllers 110 being directly connected to the upstream port 405 of the first controller card 510.

In one version, the chain master 130 self-identifies by self-assigning a specific address or other identifier (e.g., 1), and the remaining controller cards 120 in the chain can increment their addresses relative to the address of the chain master 130 (e.g., 2, 3, etc.). The chain master 130 in other examples can self-identify when a specific sensor, such as a wake-up photoeye 250, is connected to the card. Once the chain master 130 has been identified, the remaining downstream cards are again able to self-identify in a sequential or cascading fashion from the first card (e.g., 2, 3, 4, etc.). For example, the second controller card 520 in one form receives a signal, such as in the form of an address, identifier, and/or command, through the sideband communication channel 245 from the upstream, first controller card 510. In response to receiving the signal, the immediate downstream card self-identifies as the second controller card 520 (e.g., 2), and using the sideband communication channel 245 connected to the downstream port 410 of the second controller card 520, the newly self-identified second controller card 520 communicates with the next downstream controller card 120 so that the third card can self-address or identify in a similar fashion. This process of self-identifying continues in a similar fashion of the remaining controller cards 120 until the last controller card 120 is reached. Each time an address is assigned, the address and other pertinent information can be broadcasted to the other controller cards 120 in the link through the sideband communication network.

As explained above, the last controller card 120 can self-detect its relative position in the chain in several ways. For instance, the last controller card 120 can detect a high resistance or open connection on the sideband link pins in the downstream port 410. The last controller card 120 in the line can also self-identify as being the last controller card 120 in the line by monitoring signals from other connected devices like sensors and/or motors. Once the last controller card 120 is assigned an address, the last controller card 120 can communicate the completion of the process on the sideband communication network. It should be recognized that this technique of self-addressing the controller cards 120 reduces the risk of address errors as well as simplifies installation of new controller cards 120. Moreover, using the sideband communication network (i.e., the sideband communication channels 245) with this technique, reduces congestion on the carrier network or CAN as well as reduces communication errors.

Figure 6:
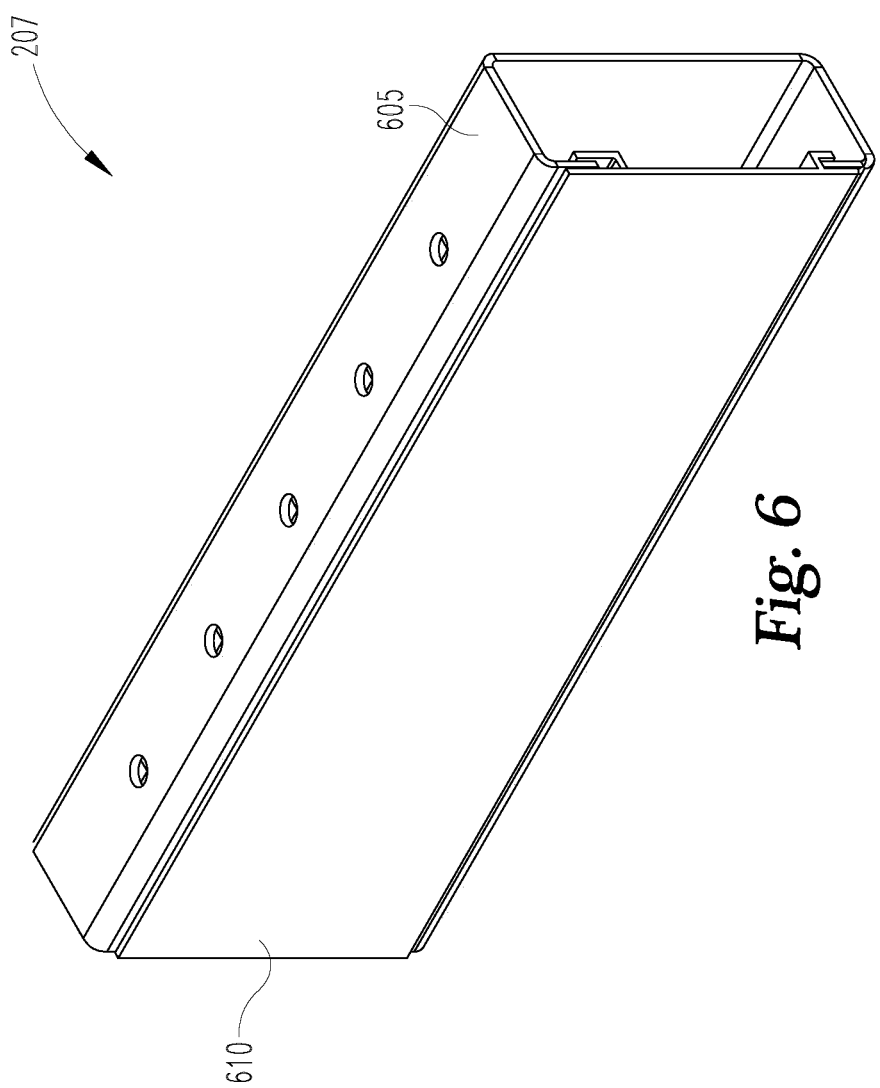
FIG. 6 is a perspective view of a controller card.
Figure 7:
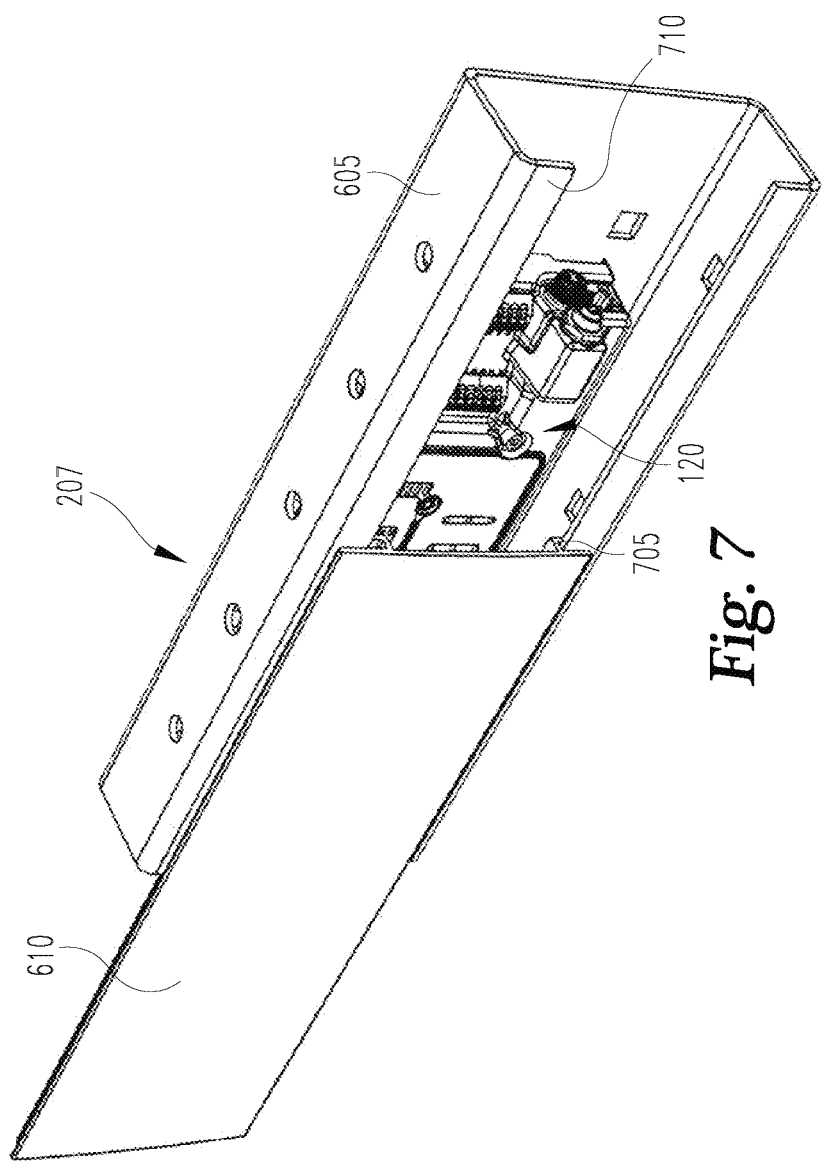
FIG. 7 is a perspective view of the controller card of FIG. 6.
Figure 8:
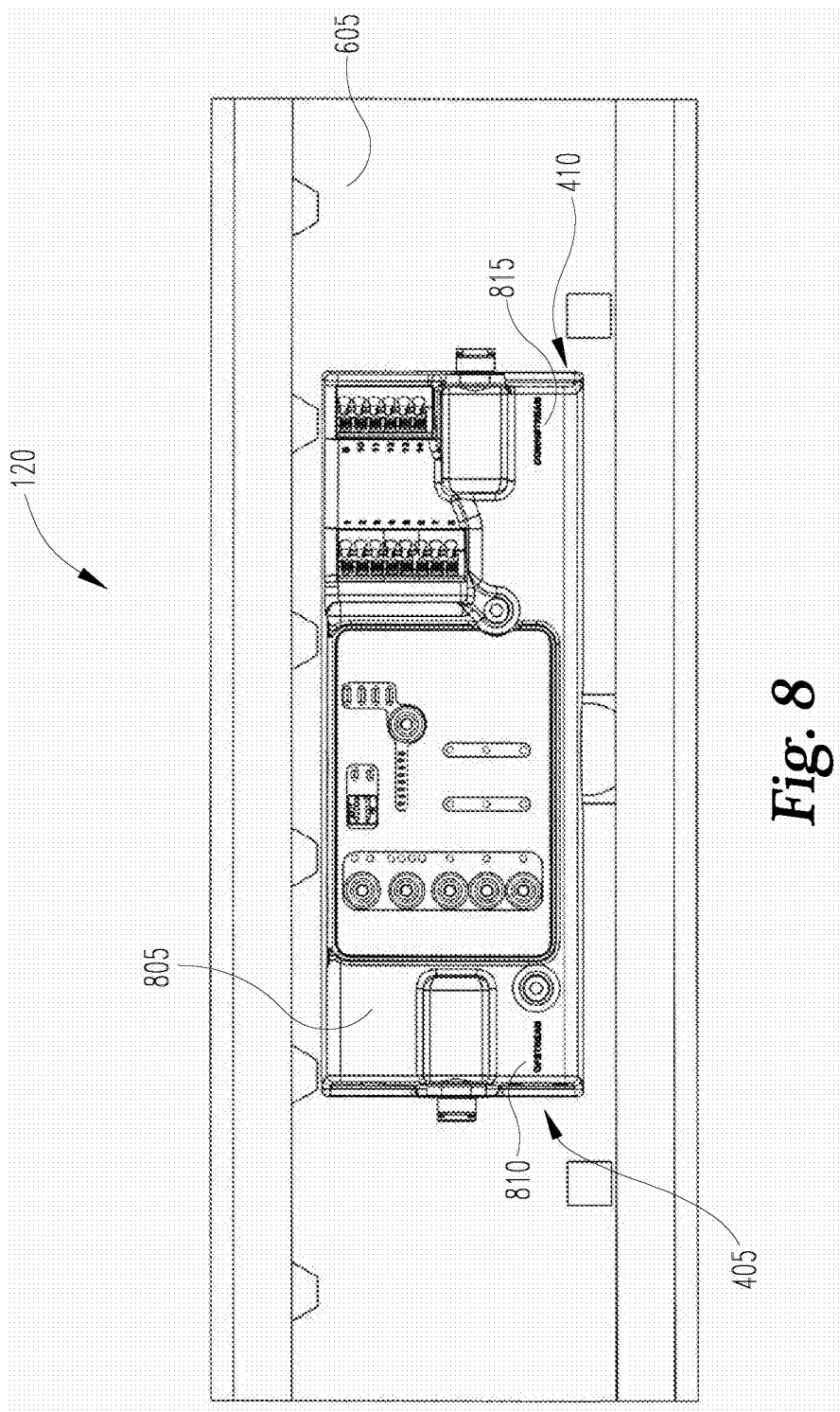
FIG. 8 is a front view of the controller card of FIG. 6.

Shown in FIGS. 6, 7, and 8, is an example of the controller card 120 described previously. The controller card 120 is typically retained within a channel 605 of the rails 207. The controller card 120 may be located behind an access panel 610 to prevent damage to the controller card 120. The access panel 610 is slidably removable from the channel 605 via groove 705. The groove 705 slides on a set of tracks 710 extending from the channel 605. The channel 605 is configured to surround and protect a circuit board 805, an upstream port 810, and a downstream port 815. As should be appreciated, the upstream port 810 corresponds to the upstream port 405 and the downstream port 815 corresponds to the downstream port 410 described in the previous examples.

Figure 9:
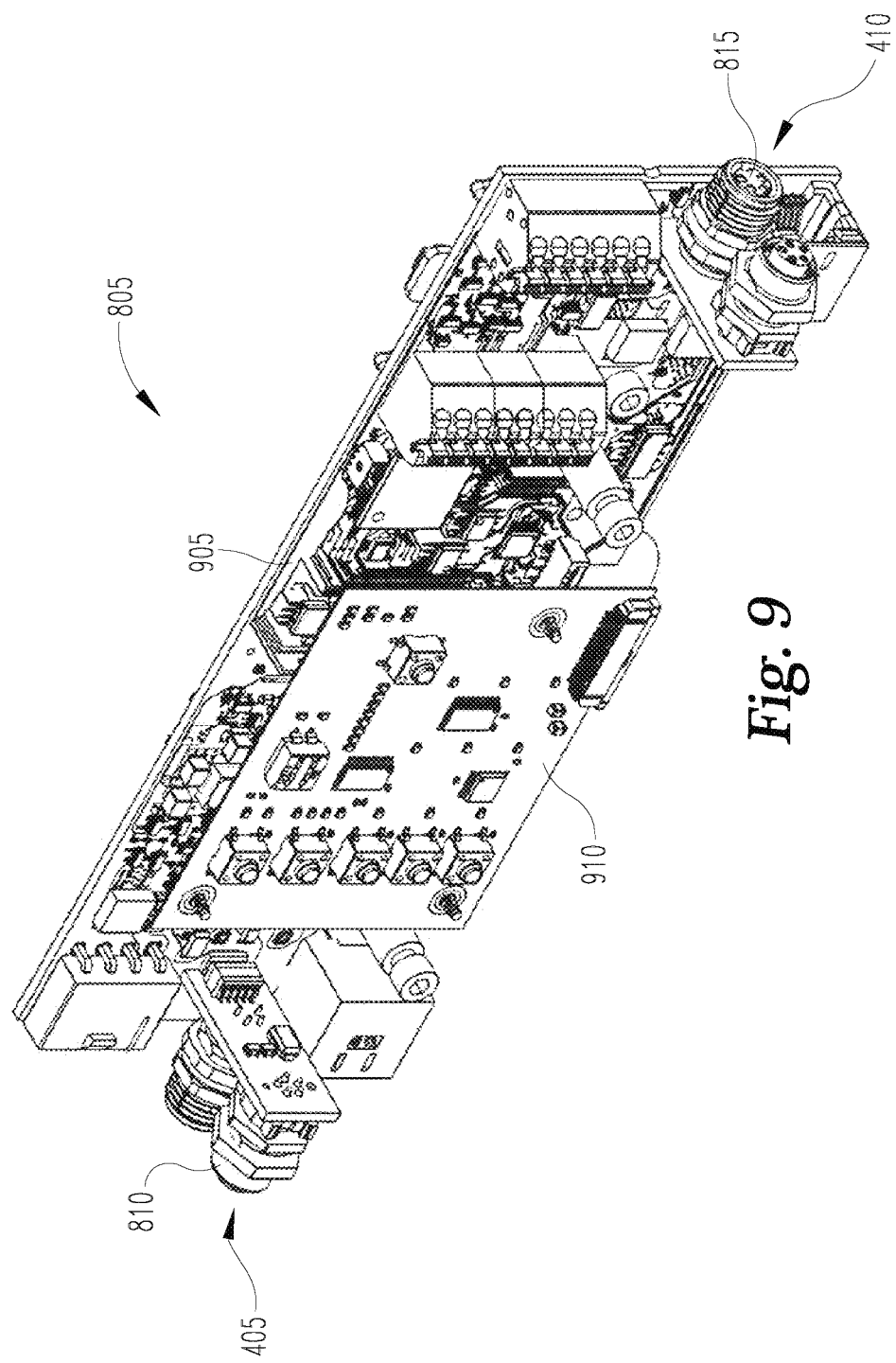
FIG. 9 is a perspective view of a circuit board.
Figure 10:
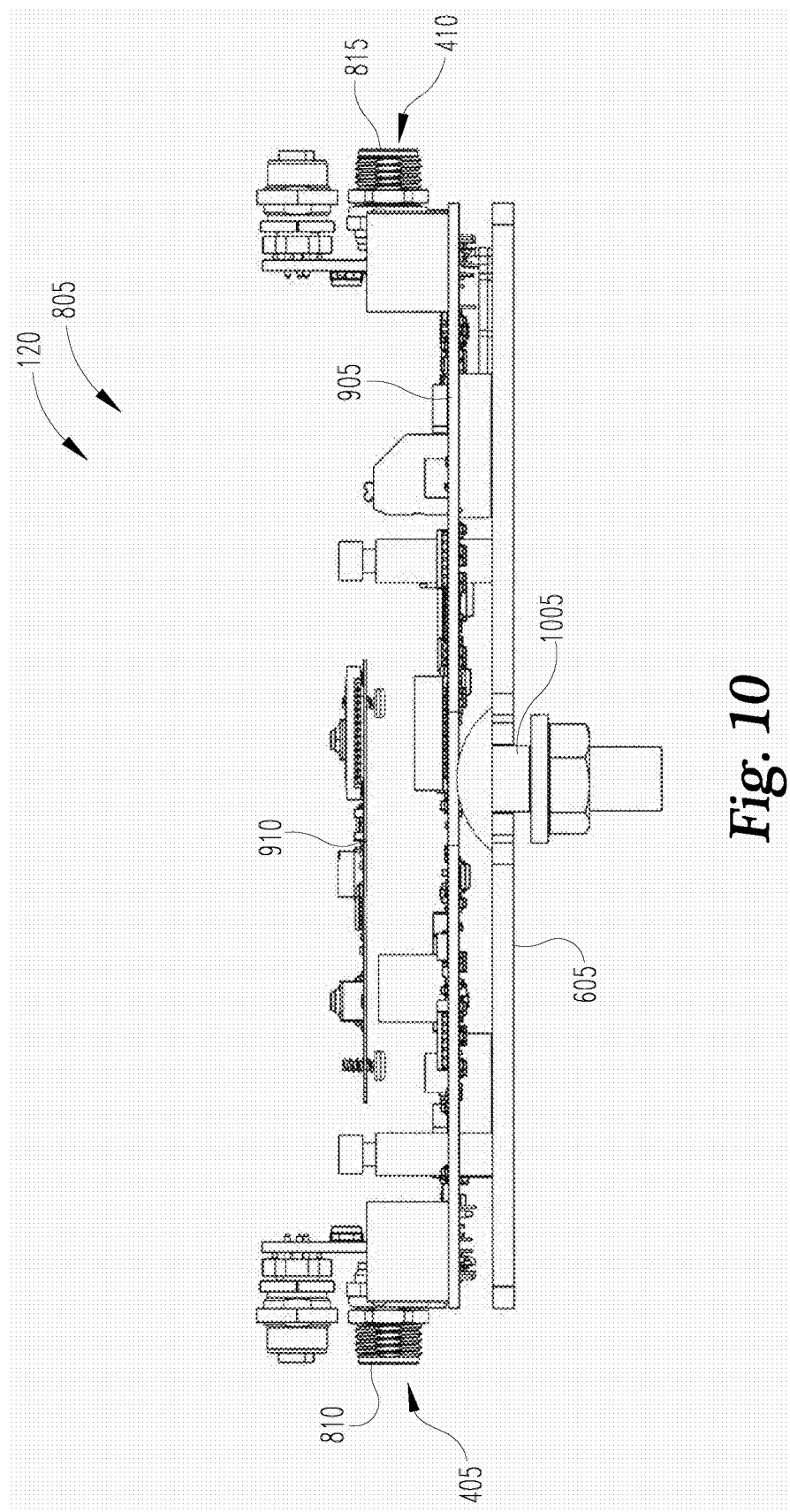
FIG. 10 is a top view of the circuit board of FIG. 9.

As shown in FIGS. 9 and 10, the circuit board 805 includes a main board 905 and a secondary board 910. The controller card 120 is mounted to a desired work location via a fastener 1005. The fastener 1005 may be a screw, bolt, rivet, weld, adhesive, and/or another type of fastener.

Figure 11:
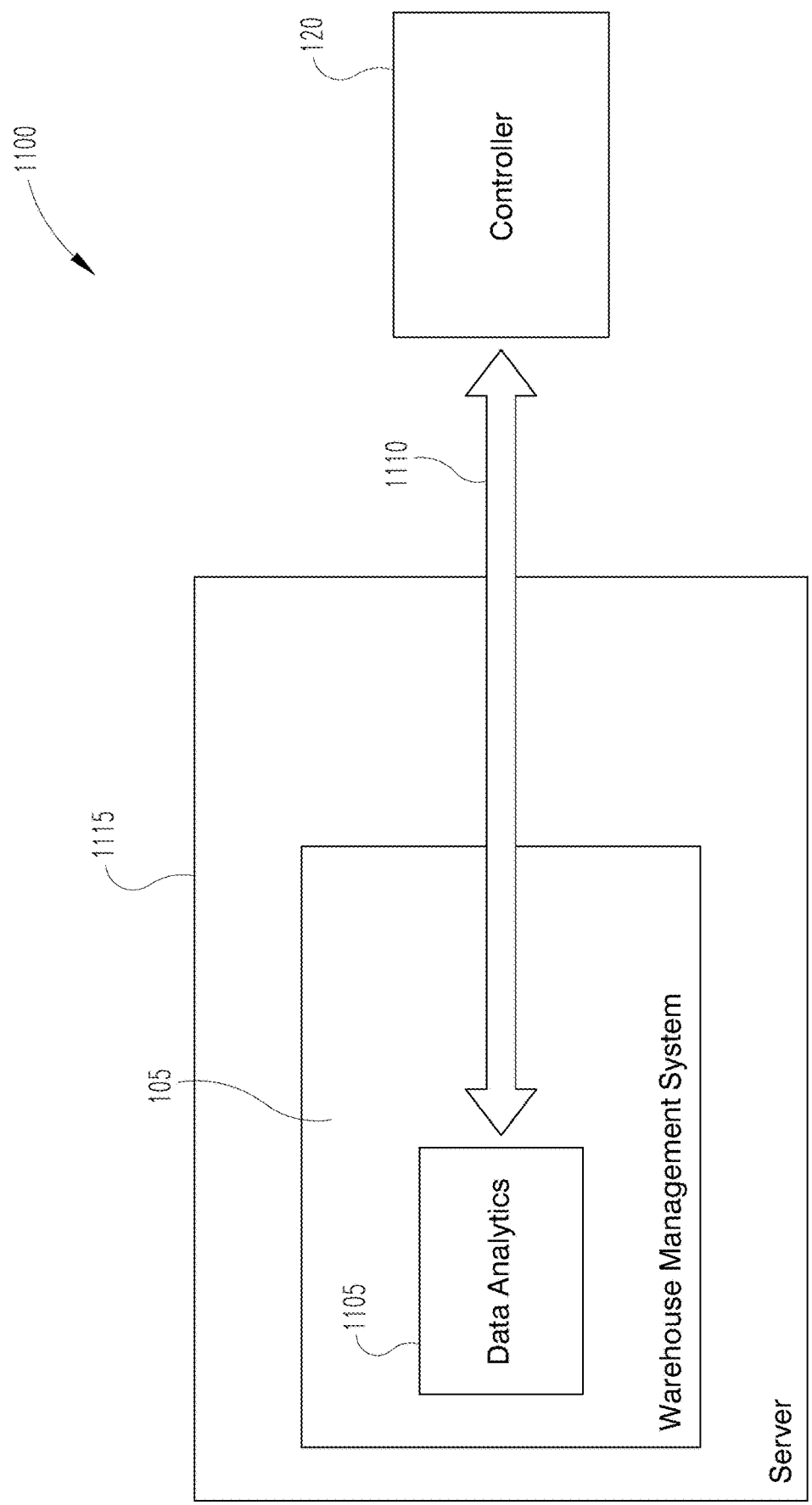
FIG. 11 is a block diagram of a data analytics system.

FIG. 11 shows an example of a data analytics system 1100 that can be used to analyze various aspects of the conveyor system 100. The data analytics system 1100 includes one or more of the controller cards 120 in communication with a data connection 1110. As should be recognized, the data analytics system 1100 is typically incorporated into a logistics system like the conveyor system 100 of FIG. 1. For the sake clarity, selected components of the FIG. 1 conveyor system 100 have not been illustrated in FIG. 11. It for example should be appreciated that the data analytics system 1100 can include the programmable logic controllers 110, conveyor zones 115, communication cables 125, and conveyors 205 of the type illustrated and described with reference to FIGS. 1, 2, 3, 4, 5, 6, 7, 8, 9, and 10. The data analytics device 1105 may be a computer program generally stored on a remote computer or server. For instance, the data analytics device 1105 in one form is a component of the warehouse management system 105 that is generally stored on a server 1115. In other examples, the data analytics device 1105 may be at least in part a microchip stored within a single controller card 120 or across multiple controller cards 120. In some examples, the data analytics device 1105 is located on a remote server 1115 located at an offsite location, but in other examples, the server 1115 is located on-site at a warehouse or other facility. The server 1115 in one version is operatively coupled to the programmable logic controllers 110 and controller cards 120 through a local area network (LAN) or controller area network (CAN) that forms the data connection 1110. The data analytics device 1105 is able to generate reports related to conveyor efficiency, conveyor downtime, preventative maintenance, warehouse simulation, package throughput, and/or other data driven statistics.

The data analytics device 1105 generally receives information related to conveyor status, package tracking, motor statistics, and/or other conveyor information from the controller cards 120. The controller card 120 is configured to share information with the data analytics device 1105 via the data connection 1110. The data connection 1110 facilitates two-way communication between the controller cards 120 and the data analytics device 1105, and the data connection 1110 can include wired and/or wireless type networks such as of the type described above. For example, the controller cards 120 are configured to send information to the data analytics device 1105, and the data analytics device 1105 and/or the warehouse management system 105 via the programmable logic controllers 110 send responses to the information back to the controller cards 120. In one example, the data connection 1110 is an Ethernet connection from the controller card 120 to the warehouse management system 105 as discussed previously. In other examples, the programmable logic controllers 110 may be a wireless connection for wireless transfer of information from the controller card 120 to the warehouse management system 105. In yet another example, the controller card 120 may upload information into a cloud based storage device for download by the warehouse management system 105 monthly, weekly, daily, and/or as frequently as desired.

Figure 12:
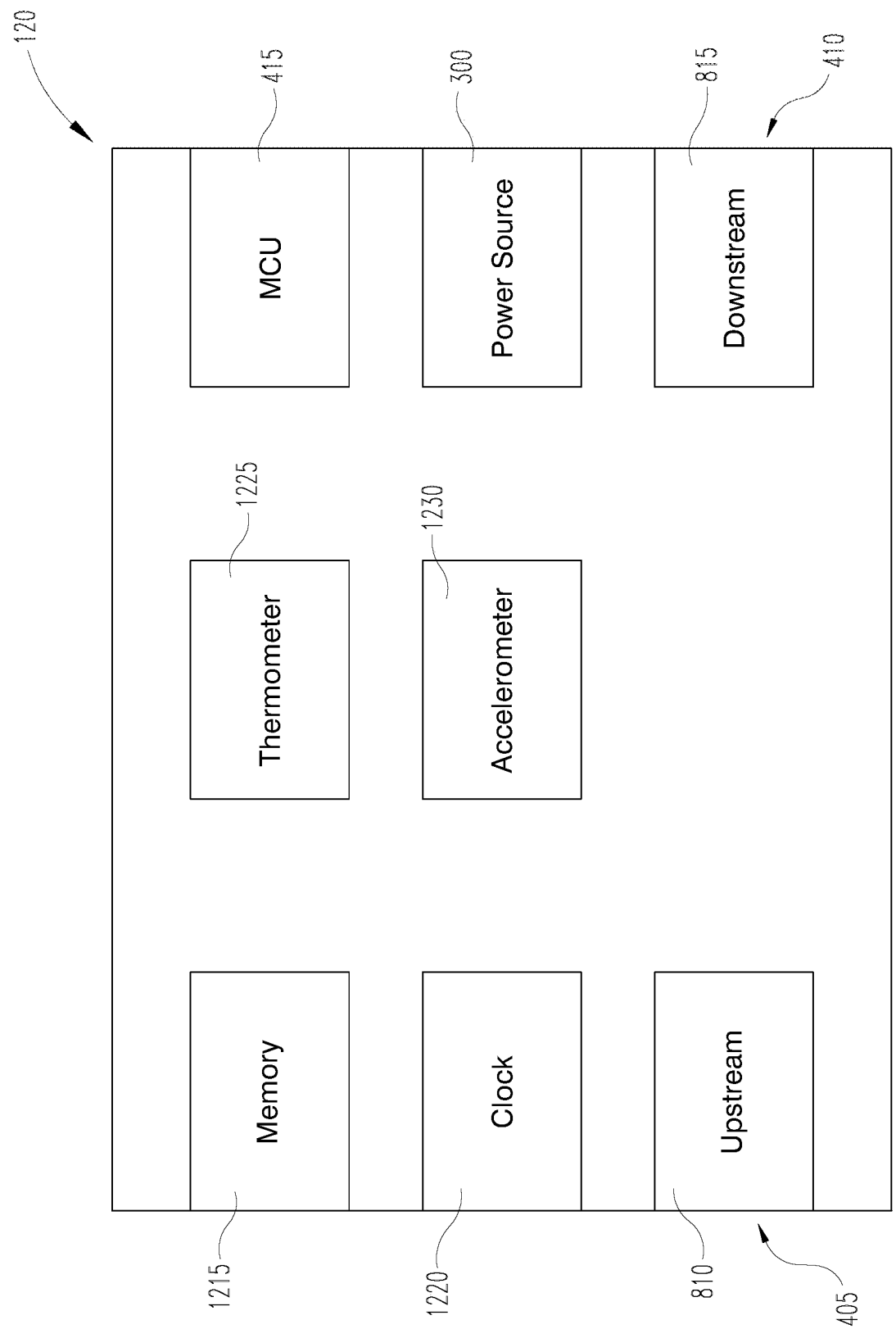
FIG. 12 is a block diagram of the controller card.

For the data analytics system 1100, the controller cards 120 are configured to supply information concerning the operation of the controller cards 120, conveyors 205, sensors, and other information about the conditions of the facility. FIG. 12 shows a version of the controller card 120 with some additional components. The controller card 120 in FIG. 12 shares all of the components for the controller card 120 described above with respect to the FIGS. 1, 2, 3, 4, 5, 6, 7, 8, 9, and 10, but some of these components have not been show in FIG. 12 for the sake of clarity. As can be seen, the controller card 120 includes the power system 300, the motor control unit 415 (i.e., microprocessor), the upstream port 405 (i.e., upstream port 810), and the downstream port 410 (i.e., downstream port 815) of the type described before. As also depicted, the controller card 120 has memory 1215 where information processed by the motor control unit 415 is stored and a clock 1220 operatively connected to the motor control unit 415 for tracking time of various events. For instance, the clock 1220 may be used to determine the amount of time for a package 240 to move through the conveyor zone 115. The clock 1220 may also be used to determine the amount of time a roller 208 and/or controller card 120 has been in use. For example, the controller card 120 may send an alert for preventative maintenance when the roller 208 and/or controller card 120 reaches a certain operational time limit for use. The controller card 120 shown in FIG. 12 functions in a similar manner to what has been described previously.

The controller card 120 has additional components used to sense or monitor various conditions related to the controller card 120 and the facility in general. As for example shown in FIG. 12, the controller card 120 further includes a thermometer 1225 (temperature sensor) and an accelerometer 1230 that are operatively connected to the motor control unit 415 as well as other components of the controller card 120. The thermometer 1225 is used to determine the temperature of the controller card 120 and the surrounding environment. The thermometer 1225 is generally located on the main board 905 of the controller card 120 (FIG. 9). As should be appreciated, electronic components function most efficiently within particular temperature bands. If an electronic component gets too hot and overheats the component risks failure. The thermometer 1225 is used to determine whether the controller card 120 is above the predetermined temperature range. If the controller card 120 is above the preset temperature range the thermometer 1225 may signal the controller card 120 to shut down and send an alert for maintenance. The thermometer 1225 may also be used to generate a heatmap of the warehouse facility. The heatmap may be used by the warehouse management system 105 to assist in design of the warehouse facility. For instance, in refrigerated warehouse environments, the thermometers 1225 can be used to show parts of the facility that may be too hot or too cold. High temperatures can also be indicative of eminent equipment failure. For instance, motors used to drive the rollers 208 of the conveyors 205 tend to overheat due to bearing wear, electrical shorts, and other failures. By the thermometer 1225 of the controller card 120 detecting hot conditions, the warehouse management system 105 can alert repair personnel of the potential motor problem.

The accelerometer 1230 of the controller card 120 can be used to proactively alert personnel of issues before any significant problems occur. With certain equipment, vibrations caused by motors, rollers 208, and other equipment may be too fast for humans to perceive and/or there is too much equipment to be practically monitored for vibrations within a facility. The repeated vibrations can for instance lead to metal fatigue and failure. As an example, an unbalanced roller 208 or motor can vibrate the conveyor 205 which in turn can lead to cracks forming in the frame 206 of the conveyor 205. The accelerometer 1230 is used by the controller card 120 to monitor vibration of the controller card 120 and the conveyor 205. The accelerometer 1230 is generally located on the main board 905 of the controller card 120 (FIG. 9). If the accelerometer 1230 reads a vibration value that is greater than the preset vibration limit, the controller card 120 via the warehouse management system 105 and/or programmable logic controllers 110 sends an alert to maintenance personnel and/or takes other appropriate action. Alternatively or additionally, the controller card 120 may for example automatically shut down the conveyor zone 115 until the alert is cleared for safety reasons. Following a mechanical, electrical, and/or calibration change, the data analytics system 1100 is further configured in one variation to generate and send an alert to a UI and/or take other measures. For instance, the alert may include a summary of the changes made.

Figure 13:
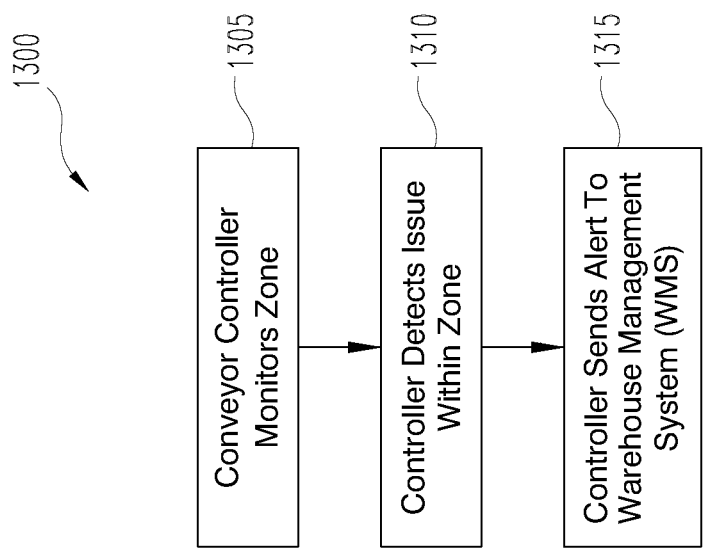
FIG. 13 is a flowchart of a technique for monitoring a conveyor zone.

A technique for detecting issues within a conveyor zone 115 will now be described with reference to FIGS. 11, 12, and 13. FIG. 13 shows a flowchart 1300 illustrating a general technique for detecting issues within the conveyor zone 115 and generating alerts using the warehouse management system 105, programmable logic controllers 110, and/or controller card 120. Specific implementations of this technique will be subsequently described below with reference to FIGS. 14, 15, 16, 17, 18, 19, and 20. While the controller card 120 will be described as primarily performing these acts, it should be recognized that some or all of the acts shown in the FIG. 13 flowchart 1300 can be performed by the warehouse management system 105 and/or programmable logic controllers 110.

At stage 1305, the controller card 120 monitors the rollers 208 of the conveyors 205 within the conveyor zone 115. The controller card 120 in stage 1310 determines there is an issue within the conveyor zone 115. For example, the issue may be a temperature issue, vibration issue, package issue, and/or any other type issue associated with the conveyor zone 115. Example techniques for detecting these as well as other issues will be described in more detail below with respect to the subsequent drawings. At stage 1315, the controller card 120 sends an alert via the data connection 1110 to the warehouse management system 105. In some examples, the controller card 120 may shut down the conveyor zone 115 to prevent further damage while the alert is active. The warehouse management system 105 may forward the alert to one or more maintenance technicians. Once the issue is resolved, the alert is cleared with the warehouse management system 105 and the controller card 120 resumes operation of the conveyor zone 115.

In one example, the controller card 120 in one form is configured to monitor the health or state of the rollers 208 by measuring the electrical properties of the rollers 208. In other words, the controller card 120 is able to monitor the state of the rollers 208 based on the normal communication and power wire connections between the controller card 120 and the rollers 208 (see e.g., FIG. 3). This allows the status of the rollers 208 (or other equipment) to be monitored without the need for additional sensors. As will be explained below, this configuration also allows the controller card 120 to monitor the presence and other properties of the packages 240 conveyed in the conveyor zone 115 (e.g., weight and/or length of the items).

The data analytics system 1100 is able to monitor the status of the rollers 208 and packages 240 by monitoring the electrical profile of the rollers 208. The electrical profile of the roller 208 monitored through a number of electrical connections, such as via the power line to and/or from the rollers 208 as well as via the ground connection to the rollers 208. The monitored electrical properties for example include electrical current, voltage, power, and/or phase. In one example, the controller card 120 monitors the current drawn during idling of the rollers 208. The current draw is constantly analyzed via the current sensors 322 and compared to an expected value or an expected operational range (i.e., tolerance) based on design and/or historical information. If the controller card 120 detects an issue with the actual and expected values for the rollers 208, the controller card 120 sends an alert to the warehouse management system 105 indicating maintenance is needed or performs some other corrective action.

Figure 14:
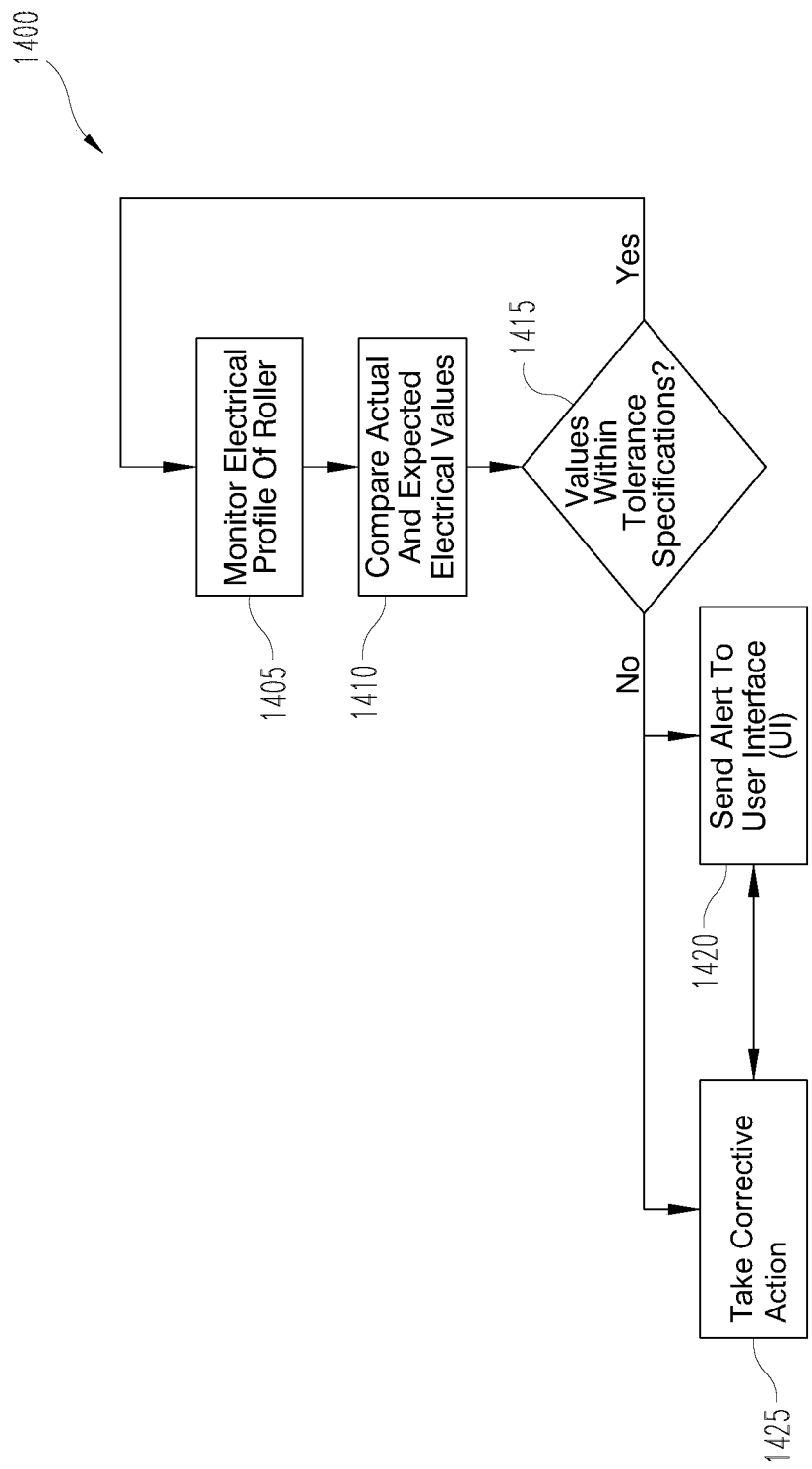
FIG. 14 is a flowchart of a method for monitoring electrical properties of a conveyor in the conveyor zone.

A technique for monitoring the electrical profile of the conveyor 205 will now be described with reference to a flowchart 1400 shown in FIG. 14. The technique will be described with respect to rollers 208 that are motorized drive rollers (MDRs), but it should be recognized that this technique can be used for other types of components of the conveyor 205 such as external conveyor drive motors or solenoids. The electrical profile of one or more rollers 208 is generally monitored by the controller card 120. In some examples, the controller card 120 reports variances in the electrical profile of the roller 208 to the warehouse management system 105 via the data connection 1110. While the controller card 120 will be described as primarily performing the acts illustrated in the flowchart 1400 of FIG. 14, it should be recognized that some or all of the acts shown in the FIG. 14 flowchart 1400 can be performed by the warehouse management system 105 and/or programmable logic controllers 110.

At stage 1405, the controller card 120 monitors an electric profile of one or more rollers 208 within the conveyor zone 115. The electric profile may include the current drawn by the rollers 208. Referring again to FIGS. 3, 4, and 12, the motor control unit 415 of the controller card 120 in one form monitors the current drawn by the motorized drive rollers via the current sensors 322. The motor control unit 415 of the controller card 120 in stage 1410 compares the actual electric profile information with an expected electric profile stored in memory 1215. At stage 1415, the motor control unit 415 determines whether the actual electric profile is within a preset range. If the electric profile is within the range operation of the conveyor zone 115 continues monitor the electrical profile in stage 1405. However, if the electric profile is not within the range, the motor control unit 415 of the controller card 120 sends an alert to a user interface of the controller card 120, programmable logic controllers 110, and/or warehouse management system 105 indicating a problem with one or more rollers 208 at stage 1420. Sequentially or simultaneously with stage 1420, the controller card 120 may take corrective action at stage 1425. Corrective action may include stopping operation of the conveyor zone 115, the individual roller 208, and/or retesting the roller 208 to confirm the electric profile is outside of the predetermined specifications.

Some preventative maintenance routines are scheduled based on how long a piece of equipment operates. In most warehouse and manufacturing facilities, tracking and logging the runtime of each piece of equipment can be time consuming, and due to unexpected stoppages of equipment, accurate tracking can be very difficult. A technique for monitoring the run time of equipment, such as the controller cards 120, conveyors 205, and photoeyes 250, within the conveyor zones 115 will now be generally described with reference to FIG. 12 and a flowchart 1500 in FIG. 15. In one example, the motor control unit 415 and clock 1220 of the controller card 120 work together to track the time of the rollers 208 and controller cards 120 are in use, but the controller card 120 can track the runtime of other equipment. In some examples, the controller card 120 sends an alert to the warehouse management system 105 when the number of hours meets or exceeds a predetermined value. While the controller card 120 will be described as primarily performing the acts illustrated in the FIG. 15 flowchart 1500, it should be recognized that some or all of the acts shown in the FIG. 15 flowchart 1500 can be performed by the warehouse management system 105 and/or programmable logic controllers 110.

Figure 15:
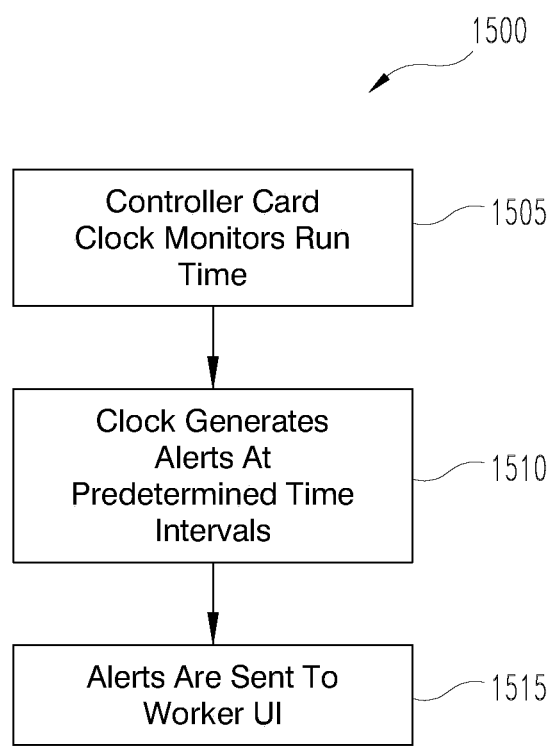
FIG. 15 is a flowchart of a method for monitoring time in the conveyor system.

At stage 1505 in FIG. 15, the clock 1220 of the controller card 120 monitors the runtime of the controller card 120 and/or rollers 208. For example, the clock 1220 may be reset when a new controller card 120 and/or roller 208 is installed and run as long as the controller card 120 and/or roller 208 is active. In case of power outages, the motor control unit 415 periodically stores the equipment runtimes from the clock 1220 in memory 1215. Sometimes rollers 208 may idle for significant periods of time. For the rollers 208, the motor control unit 415 and the clock 1220 time how long the rollers 208 run or idle by monitoring the current drawn by the rollers 208 through the current sensor 322. At stage 1510, the controller card 120 generates an alert at predetermined time intervals corresponding to minutes, hours, or days of use on the controller card 120 and/or roller 208. This information can be further tracked by the programmable logic controllers 110 and/or data analytics device 1105. For example, the controller card 120 may generate alerts at predetermined runtime intervals. These alerts can also be provided via user interfaces on the warehouse management system 105, programmable logic controllers 110, and/or controller card 120 in stage 1515. For example, a text alert or an app popup alert may appear on a mobile phone of a maintenance worker. These alerts can also include preventative maintenance actions to be performed by the maintenance worker on the controller card 120 and/or roller 208 prior to resetting the clock 1220.

A technique for monitoring the temperature profile of the controller cards 120 and conveyors 205 will now be described. The temperature of the controller card 120 is generally monitored by the thermometer 1225. In some examples, the controller card 120 reports variances in the temperature profile of the controller card 120 and the conveyor 205 to the warehouse management system 105 via the data connection 1110. A technique for generating a heatmap of the warehouse based on this temperature information is also depicted in FIG. 16.

Figure 16:
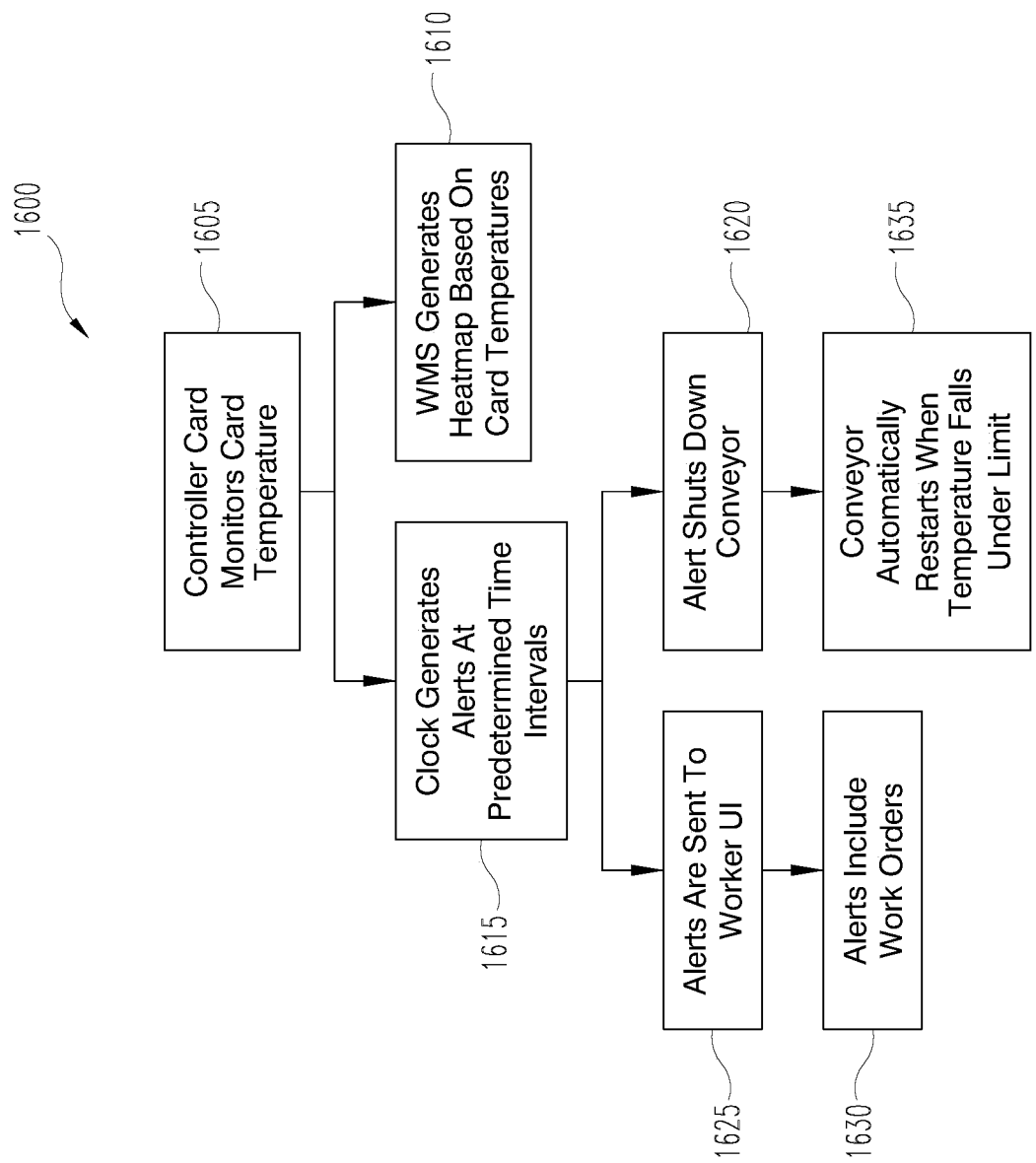
FIG. 16 is a flowchart of a method of generating a heat map.
Figure 17:
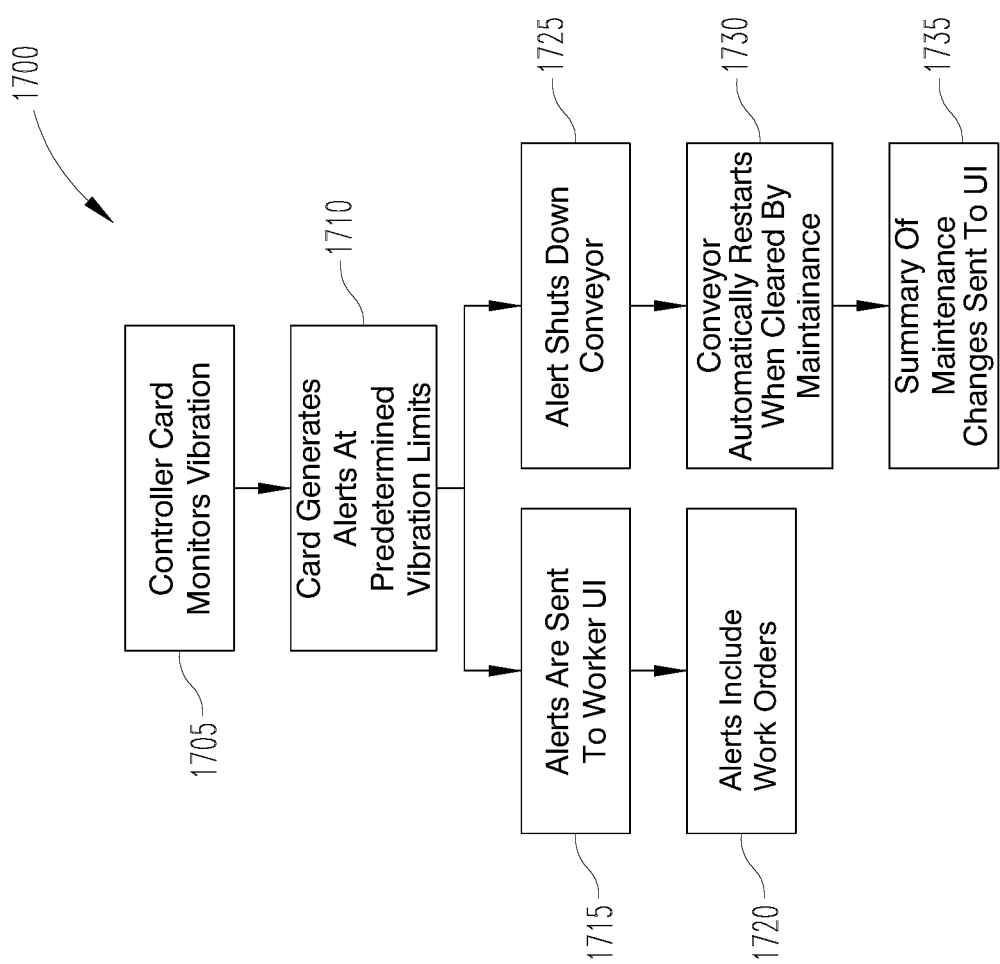
FIG. 17 is a flowchart of a method for monitoring vibrations with the controller card.

FIG. 16 shows a flowchart 1600 depicting a technique for monitoring the temperature profile of the controller cards 120 from which the warehouse management system 105 can use to generate a heatmap of the facility. In this technique, the temperature data from the thermometers 1225 in the controller card 120 is sent to the warehouse management system 105 via the data connection 1110. At stage 1605, the motor control unit 415 monitors the temperature of the controller card 120 via the thermometer 1225. As shown in FIGS. 6, 7, and 8, the controller card 120 is usually mounted to the rails 207 of the conveyor 205. Consequently, the temperature measured by the thermometer 1225 in the controller card 120 is a close approximation to the temperature of the environment surrounding the conveyor 205. This temperature information is uploaded to the warehouse management system 105 at stage 1610. Also, at stage 1610, the warehouse management system 105 uses the temperature information from the controller card 120 to generate a heatmap of the warehousing facility. The heatmap may be used to modify the warehouse/conveyor layout to change or address the temperature profile at various conveyor zones 115 in the facility. This in turn can save energy by enhancing the heating or cooling efficiencies in the facility. Moreover, this heatmap in conjunction with the travel times of the packages 240 in the facility (see e.g., FIG. 18) can ensure food safety by confirming any chilled food was not exposed to high temperatures over extended periods of time, and when this occurs, the chilled or frozen packages 240 can be readily tracked and identified (see e.g., FIGS. 19 and 20) for separation from the rest of the packages 240 on the conveyor system 100.

At the same time or nearly at the same time, the motor control unit 415 checks the temperature from the thermometer 1225 against a designated temperature range stored in memory 1215. If the temperature of the controller card 120 is at or hotter than an upper limit (or cooler than a lower limit), the controller card 120 generates an alert in stage 1615 in a fashion similar to that described above. For instance, the controller card 120 can generate a visual and/or audio alert. Likewise, the warehouse management system 105 and programmable logic controllers 110 can generate similar alerts.

At stage 1620 the alert shuts down the controller card 120 and/or conveyor zone 115 to prevent further damage to the controller card 120. Moreover, the alert can be remotely sent to the appropriate personnel in stage 1625. As an example, a maintenance worker can receive a text message or app alert on a mobile phone that alerts them to the temperature issue as well as provide any additional information. In one version, the controller card 120 sends an alert to the maintenance worker to indicate that the controller card 120 and/or conveyor 205 is in need of maintenance. In one example, the alert includes a work order for replacement/repair of the particular equipment in stage 1630. At stage 1635, the controller card 120 and/or conveyor 205 automatically restarts operation after the temperature is within the specified limits. As should be appreciated, the controller card 120 may simply shut down the conveyor and restart the conveyor zone 115 when the temperature within the limit instead of sending a work order to perform maintenance in stage 1630.

Once more, vibrations caused by motors, rollers 208, and other equipment may be too fast for humans to perceive and/or there is too much equipment to be practically monitored for vibrations within a facility. The repeated vibrations can for instance lead to metal fatigue and failure. As an example, an unbalanced roller 208 or motor can vibrate the conveyor 205 which in turn can lead to cracks forming in the frame 206 of the conveyor 205. The accelerometer 1230 is used by the controller card 120 to monitor vibration of the controller card 120 and the conveyor 205. The accelerometer 1230 is generally located on the main board 905 of the controller card 120 (FIG. 9). If the accelerometer 1230 reads a vibration value that is greater than the preset vibration limit, the controller card 120 via the warehouse management system 105 and/or programmable logic controllers 110 sends an alert to maintenance personnel and/or takes other appropriate action. This technique for monitoring the vibration within one or more rollers 208 will now be described with reference to a flowchart 1700 in FIG. 17. The vibrations are generally monitored by the accelerometer 1230 on the controller card 120. The controller card 120 may use the vibration information to assess the wear and tear on the rollers 208. If the vibration read by the accelerometer 1230 exceeds a predetermined limit, the controller card 120 sends an alert to the warehouse management system 105 and/or programmable logic controllers 110 and/or shuts down the appropriate conveyor 205, rollers 208, and/or other equipment.

At stage 1705, the motor control unit 415 monitors vibration of the controller card 120 via the accelerometer 1230. Again, the controller card 120 is typically attached to the conveyor 205 such that the vibration of the controller card 120 is indicative of the vibration of the conveyor 205. The controller card 120 in stage 1710 generates an alert and/or takes other appropriate action when the vibration readings exceed an upper limit stored in memory 1215. This limit can for instance be based on frequency, amplitude, and/or harmonics of the vibrations. At stage 1715, the alerts are sent to one or more maintenance technicians in the manner as described before (e.g., text message, audio alert, visual alert, etc.). In one example, the alerts include one or more work orders provided by the warehouse management system 105 and/or controller card 120 in stage 1720.

To minimize or avoid equipment damage, the motor control unit 415 of the controller card 120 at the same time or nearly at the same time shuts down the problematic conveyor 205 in stage 1725 by opening one or more of the current sensors 322 to cut off power to the rollers 208 of the conveyor 205. As should be appreciated, excessive vibration can damage components of the conveyor 205 and decrease the operational life of the conveyor 205 or other equipment in the conveyor zone 115. Similarly, excessive vibrations may create loose electrical connections and increase the risk of an electrical fire. At stage 1730, the conveyor 205 or other problematic equipment is reviewed and the alert is cleared by the maintenance personnel. After the alert is cleared, the controller card 120 may automatically restart operation of the conveyor zone 115. At stage 1735, a summary of the maintenance changes made is sent to the data analytics device 1105 of the warehouse management system 105 for documentation purposes.

A technique for zone to zone photoeye-less tracking of packages 240 will now be generally described with respect to FIGS. 1, 2, 3, 4, and FIG. 14. Using the electrical profile from FIG. 14, the motor control unit 415 of the controller card 120 is able to determine the presence of one or more packages 240. Using the clock 1220, the controller card 120 is able to determine the time for a package 240 to progress through the conveyor zone 115.

Figure 18:
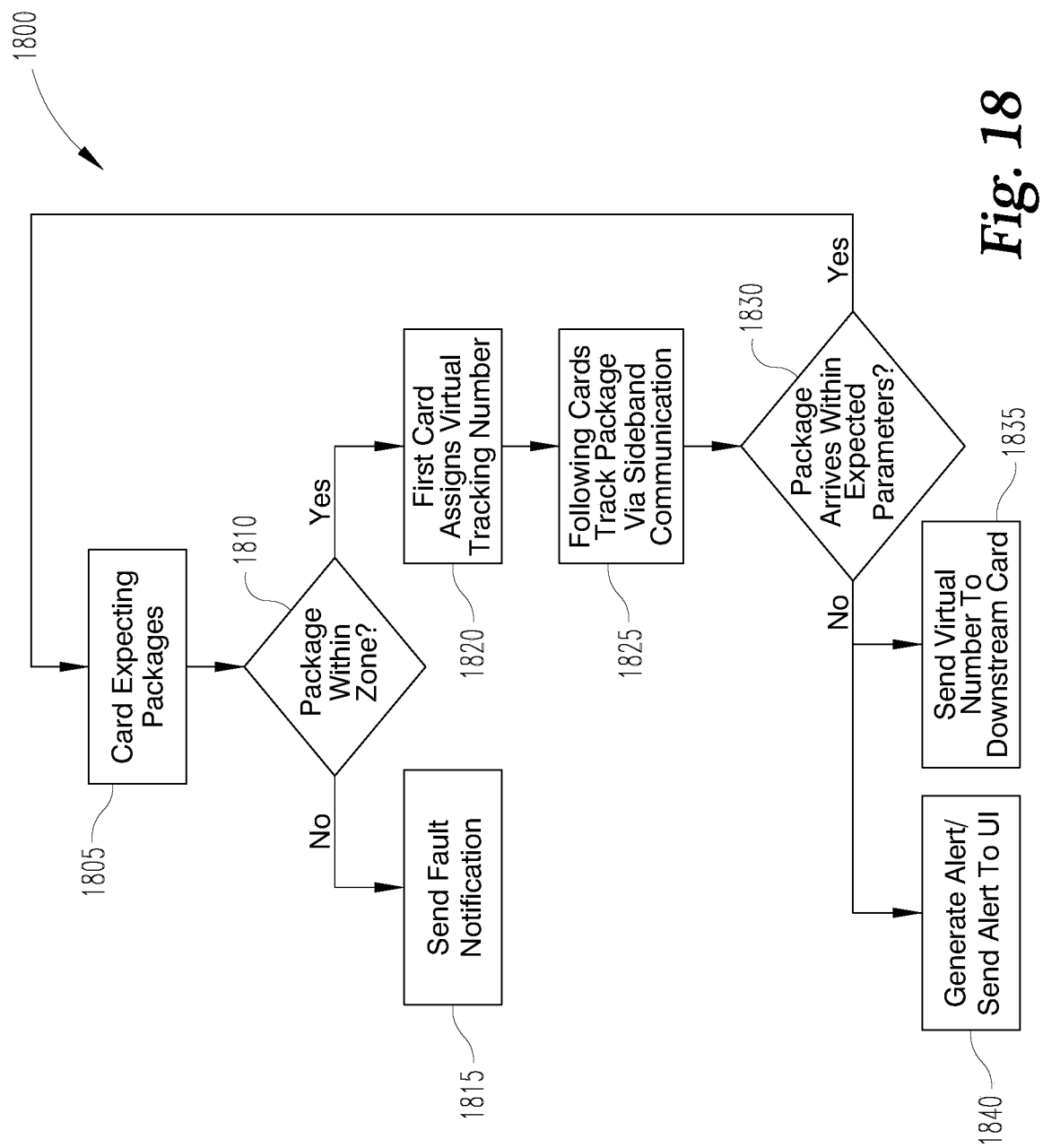
FIG. 18 is a flowchart of a method of tracking packages in the conveyor system without using photoeyes.

FIG. 18 includes a flowchart 1800 depicting a technique for zone-to-zone tracking of packages 240 using the controller card 120. The controller card 120 uses the electrical profile of one or more rollers 208 to determine package 240 location. At stage 1805, the controller card 120 is operating under standard procedure and is expecting packages 240 within the conveyor zone 115. At stage 1810 the controller card 120 identifies whether a package 240 is within the conveyor zone 115 or not. As should be appreciated, a package 240 may be detected via one or more photoeyes 250 and/or via one or more electrical properties of the rollers 208. For example, a package 240 may be detected via an increase in current draw of the roller 208 indicating the presence of a package 240. If a package 240 is not within the conveyor zone 115 the controller card 120 sends a fault notification at stage 1815. If a package 240 is detected within the conveyor zone 115 the controller card 120 assigns an identifier, such as a random virtual tracking number, to the package 240 at stage 1820. At stage 1825, the controller card 120 sends the virtual tracking information along with the package 240 to the downstream zone via the sideband communication system 500. At stage 1830 the downstream controller card 120 checks to confirm that the package 240 is received within the conveyor zone 115. If the package 240 is received then the process continues until the termination of the conveyor 205. However, if the package 240 is not received the controller card 120 will first attempt to forward the virtual tracking number to the next downstream zone in stage 1835. If the next downstream conveyor zone 115 determines the package 240 is received the controller card 120 of the intermediate zone sends an alert that the photoeye 250 and/or package tracking mechanism needs maintenance. If the next downstream zone does not receive the package an alert is generated at stage 1840 indicating that the package 240 may be lost or jammed.

For example, when a photoeye 250 or other sensor detects a package 240 or other item entering a conveyor zone 115, the controller card 120 controlling that conveyor zone 115 generates an identification number or other unique signifier for the package 240. The controller card 120 over the CAN then transmits information about the package 240 to one or more controller card 120 that control downstream conveyor zone 115. For instance, the upstream controller card 120 transmits the identification number for the package 240, the time when the package 240 arrived in the conveyor zone 115, conveyor velocity or speed in the zone, conveyor zone length, and/or estimated exit time for the package 240 from the conveyor zone 115 to the controller card 120 controlling a conveyor zone 115 located immediately downstream from the upstream controller card 120 (or further downstream control cards).

The controller card 120 for the downstream conveyor zone 115 is then able to estimate an expected arrival time for the package 240 based on the received information from the upstream controller card 120. If the photoeye 250 or other sensor for the downstream conveyor zone 115 does not detect the package 240 when expected or within a tolerance range, this could signify several issues. For example, the package 240 may have fallen off the conveyor 205 or may be jammed on the conveyor 205. This delay in detecting the package 240 in the downstream conveyor zone 115 may be caused by malfunctions in the sensor used to sense the arrival of the package 240 in the downstream conveyor zone 115. For instance, a photoeye 250 or other sensor may be misaligned, damaged, and/or broken.

Upon determining the delay in receipt of the package 240, the downstream controller card 120 then initiates an appropriate corrective protocol. For instance, the downstream controller card 120 may send an alert to the appropriate personnel and/or system, and the alert may further provide information for diagnosing the issue. As an example, the alert may identify the package 240 by a serial number and/or the system assigned package identifier. The package identification information is then used to track down or locate the missing or jammed package 240. The alert and/or other information may be transmitted to controller card 120 for conveyor zone 115 located further downstream. If a further downstream controller card 120 detects the arrival of the package 240, this indicates that the photoeye 250 or sensor which did not detect the package 240 may be malfunctioning. In response, this further downstream controller card 120 may provide an alert and/or instructions that the photoeye 250 which did not detect the package may require recalibration, repair, and/or replacement.

Figure 19:
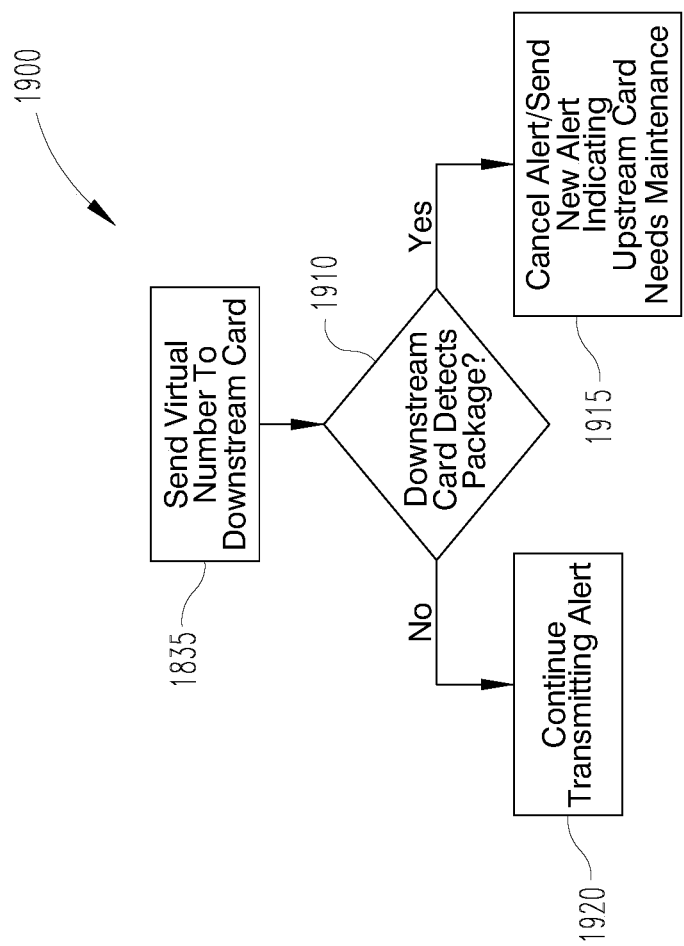
FIG. 19 is a flowchart of a method of tracking downstream packages.

FIG. 19 expands on the technique shown in FIG. 18. Specifically, FIG. 19 shows a flowchart 1900 of a more detailed example of the package 240 tracking process of FIG. 18 using the controller card 120. At stage 1835 the controller card 120 sends the virtual identifier to the downstream controller card 120 via the sideband communication system 500. At stage 1910 the downstream controller card 120 monitors the conveyor zone 115 via one or more photoeyes 250 and or via monitoring the electric profile of one or more rollers 208. If the downstream controller card 120 detects a package 240 as expected the controller card 120 cancels the alert and indicates that the upstream controller card 120 needs maintenance at stage 1915. At stage 1920 if the downstream card does not detect a package 240, the controller card 120 continues to transmit an alert that the package 240 is lost and/or misplaced.

A technique for generating a simulated warehouse using data from the controller card 120 will now be described with respect to FIGS. 13-19. The controller card 120 tracks roller 208 and package 240 data via the clock 1220, thermometer 1225, and accelerometer 1230 and/or other sensors and transmits the data to the warehouse management system 105. The warehouse management system 105 uses the data from the controller card 120 to generate a simulated warehouse environment for testing.

Figure 20:
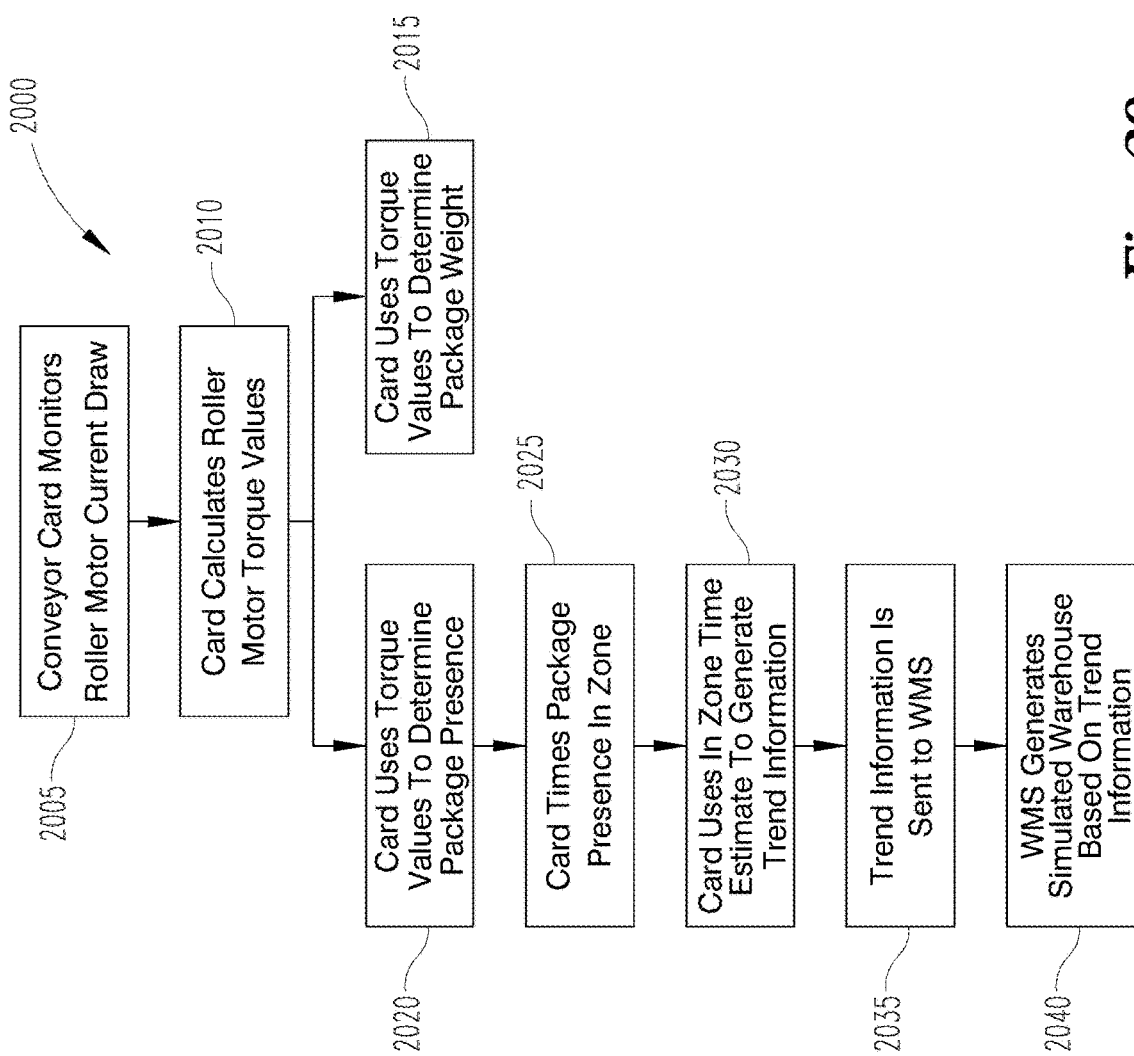
FIG. 20 is a flowchart of a method of determining properties of the packages based on properties of the rollers of the conveyor.

FIG. 20 includes a flowchart 2000 depicting a technique for generating the simulated warehouse using data from the controller card 120. At stage 2005 the controller card 120 monitors the current draw of one or more rollers 208. At stage 2010 the controller card 120 calculates the roller torque value from the current draw. For example, the controller card 120 may use a calculation for torque equal to current*voltage*efficiency*60/rpm*2 pi. Using the known values for voltage, efficiency, and revolutions per minute (rpm) the controller card 120 can calculate torque for the roller 208. At stage 2015 the controller card 120 compares the torque value calculated at stage 2010 to a table of values to determine an approximate weight of the package 240. At stage 2020 the controller card 120 uses the calculated torque values to determine the presence of one or more packages 240 in the conveyor zone 115. For example, the torque values will generally increase with a package 240 in the conveyor zone 115 as the current draw will increase due to increased power needed to move the package 240. Similarly, using the torque values and clock 1220 the controller card 120 is able to time the duration of time the package 240 is within the conveyor zone 115 at stage 2025. At stage 2030 the controller card 120 can use the zone time from stage 2025 to generate throughput and trend information for the conveyor zone 115. At stage 2035 the trend and throughput information is sent to the warehouse management system 105 from the controller card 120. This data may be sent instantaneously, daily, weekly, and/or monthly. At stage 2040 the warehouse management system 105 generates a simulated warehouse environment based on information from the controller card 120. The warehouse management system 105 may use this information to adjust variables within the system and improve the overall conveyor system to become more efficient.

For example, detailed data from the controller card 120 including throughput, package movement and transition timing, conveyor failure, total run times, package counts, package spacing, package weights, lost time, and/or other detailed information is uploaded to or aggregated on the warehouse management system 105 and/or a remote server 1115. In some cases, the server 1115 is remote from the facility housing the conveyor system. The data generated from the real-life warehouse environment is then downloaded from the server 1115 and used to create a simulated warehouse. The simulated warehouse may be used to further improve designs of conveyor operating systems.

In another aspect, package 240 travel efficiency data is recorded and saved to memory 1215 on the controller card 120. The efficiency data may be reviewed by a warehouse supervisor or team weekly, monthly, quarterly, and/or yearly to determine if the conveyor system is working as efficiently as possible. Based on the data, changes may be made to the conveyor system to create a more efficient and user-friendly environment. For example, these changes can include increasing conveyor belt speeds and/or creating new maintenance objectives.

Alternatively or additionally, the controller card 120 may be able to detect the presence, absence, weight, length, and/or other properties of a conveyed item without the need of extra sensors like photoeyes 250. As was described previously, the controller card 120 constantly monitors electrical properties of the roller 208 or other conveyor motors that provide the mechanical force for conveying the package 240. For instance, the controller card 120 in one variation monitors the current drawn by the roller 208. With the measured electrical current, the controller card 120 is able to estimate motor torque values. The motor torque values in turn enable the controller card 120 to determine if a package 240 is present or absent on a conveyor zone 115, without the use of a photoeye 250 or other sensor. Similarly, the magnitude of the torque or electrical signal is used to estimate the weight of the package 240.

The controller card 120 in further examples uses current spikes from the roller 208 to determine when a package 240 is discharged from the conveyor zone 115. As noted before, the controller card 120 in one form includes a clock 1220. As a result, the controller card 120 is configured to time the duration a particular item is conveyed on the conveyor zone 115. With this duration, conveyor velocity, and other information, the controller card 120 calculates or estimates the length of the package 240. As should be recognized, this technique may further be used to detect package jams, stalls, and/or create trend information. The trend information may be used to create an advanced warning configured to warn of upcoming bottlenecks, mechanical issues, and/or other issues. This technique further can be used in conjunction with the above-described techniques for detecting photoeye 250 or other sensor malfunctions. For instance, the roller 208 in one form acts as a backup sensor for a roller 208 in a conveyor zone 115. Any discrepancies between the conditions sensed by the controller card 120 and photoeye 250 may cause the controller card 120 to take corrective action such as by issuing an alert.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"Accelerometer" generally refers to a device or instrument that measures acceleration or the rate of change of velocity. In one form, the accelerometer measures proper acceleration in which the acceleration of a body relative to the instantaneous rest frame of the body. The accelerometer can include single-axis or multi-axis type accelerometers. By way of non-limiting examples, the accelerometer can include capacitive, resistive, capacitive, servo, laser, magnetic induction, optical, piezoelectric, resonance, and quantum type accelerometers, just to name a few.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Channel" generally refers to a long, narrow groove in a surface of an object.

"Clock" generally refers to a device or instrument that measures, verifies, keeps, and indicates time. Some non-limiting examples of clocks include mechanical (e.g., spring), astronomical, electrical (e.g., piezoelectrical), and atomic type clocks.

"Communication Link" or "Communication Channel" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Conveyor Zone" or "Zone" generally refers to a section of a conveyor. For example, a conveyor zone includes a section of conveyor driven by a single motorized drive roller (MDR) and/or other types of conveyor motors.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Frame" generally refers to the structure which supports the mechanical components of a conveyor and/or sorter that are configured to move items.

"Main Communication Channel" or "Main Communication Link" generally refers to a physical medium (e.g., wires or cables) and/or intangible constructs (e.g., frequencies, addresses, etc.) where normal network communications occur.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM). Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips. Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems. Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as: 1. a central processing unit—ranging from small and simple processors with registers as small as 4 bits or list, to complex processors with registers that are 32, 64, or more bits 2. volatile memory (RAM) for data storage 3. ROM, EPROM, EEPROM or Flash memory for program and operating parameter storage 4. discrete input and output bits, allowing control or detection of the logic state of an individual package pin 5. serial input/output such as serial ports (UARTs) 6. other serial communications interfaces like I²C, Serial Peripheral Interface and Controller Area Network for system interconnect 7. peripherals such as timers, event counters, PWM generators, and watchdog 8. clock generator—often an oscillator for a quartz timing crystal, resonator or RC circuit 9. many include analog-to-digital converters, some include digital-to-analog converters 10. in-circuit programming and in-circuit debugging support.

"Motorized Drive Roller" or "MDR" generally refers to a powered conveyor roller with an internally mounted motor that is configured to rotate or spin the roller. The MDR may be controlled via internal and/or external commutation. In one form, the motor for the MDR includes an electric DC motor.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Optionally" means discretionary; not required; possible, but not compulsory; left to personal choice.

"Photoeye", "PE", or "Photoelectric Sensor" generally refers to a device configured to detect the presence, absence, and/or distance of an object with a light transmitter (or emitter) and a photoelectric receiver. In one form, the emitter and receiver are integrated to form a single unit, and in another form, the emitter and receiver are separate components. Photoeyes can be generally categorized into three different types, opposed (through-beam), retro-reflective, and proximity-sensing (diffused) types.

"Predominately" is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Roller" generally refers to a cylindrically shaped material handling component that is able to revolve. Typically, but not always, the roller is configured to provide mechanical power transmission, a conveying surface, and/or support for conveyed objects or items. The roller can be powered or unpowered.

"Server" generally refers to a computer or group of computers that provide(s) data to other computers. It may serve data to systems on a local area network (LAN) or a wide area network (WAN) over the Internet.

"Sideband Communication" generally refers to a communication protocol or technique where normal network communications are transmitted as well as other services are provided via a main communication channel and where a separate communication channel (or sideband channel) is used to facilitate separate peer to peer communications. The sideband communication can occur in wired and/or wireless networks. For example, in a wired Ethernet network environment, normal controller area network communications can occur in the standard wires that form the main communication channel used for normal network communication and the sideband communication channel can exist on the unused wires for the main Ethernet communication protocol. For instance, the sideband communications can occur using a serial RJ485 standard. In wireless networks, the main communication channel is typically associated with a carrier frequency, and the sideband communications can occur on the lower sideband (USB) or the upper sideband (USB) lobe frequencies around the carrier frequency. In other examples where the wireless communication is digital, different addresses or other signifiers can be used to delineate the main and sideband communication channels.

"Sideband Communication Channel" or "Sideband Communication Link" generally refers to a physical medium (e.g., wires or cables) and/or intangible constructs (e.g., frequencies, addresses, etc.) where communications outside normal network communications occur. The sideband communication channel is separate and distinct from the main communication channel on a given network such that communications on the sideband communication channel have no impact on communications on the main communication channel.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Storage Container" generally refers to an object that can be used to hold or transport SKUs or other objects. By way of non-limiting examples, the storage container can include cartons, totes, pallets, bags, and/or boxes.

"Storage Facility" generally refers to a location for keeping and/or storing items or goods. A storage facility may keep the items or goods indoors or outdoors. As an example, a storage facility may be a large building, such as a warehouse, or may be an outdoor area that is either open or enclosed by a fence or by another suitable method.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Thermometer" or "Temperature Sensor" generally refers to a device or instrument that measures temperature or a temperature gradient. The thermometer can include empirical or absolute type thermometers as well as primary or secondary based thermometers. Some non-limiting examples of thermometers include thermometers using thermal expansion, pressure, density, optical, electrical resistance, electrical potential, and/or electrical resonance techniques for measuring temperature.

"Transceiver" generally refers to a device that includes both a transmitter and a receiver that share common circuitry and/or a single housing. Transceivers are typically, but not always, designed to transmit and receive electronic signals, such as analog and/or digital radio signals.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 conveyor system
105 warehouse management system
110 programmable logic controllers
115 conveyor zone
120 controller card
125 communication cable
130 chain master
200 conveyor system
205 conveyor
206 frame
207 rails
208 rollers
210 first zone
215 second zone
220 third zone
225 first controller card
230 second controller card
235 third controller card
240 packages
242 main communication channel
245 sideband communication channel
250 photoeye
300 power system
305 bus power
310 switch
320 conveyor power connector
322 current sensor
325 regulator
330 photoeye
335 light emitting diode
340 brake
345 chopper
350 logic power
355 power path selector
400 communication system
405 upstream port
410 downstream port
415 motor control unit
420 first network carrier transceiver
425 upstream sideband transceiver
427 downstream sideband transceiver
428 first carrier network connection
429 sideband connections
430 second network carrier transceiver
431 second carrier network
432 motor control unit carrier link
433 motor control unit sideband link
435 first electrical device 440 second electrical device
442 direct conveyor connection
445 termination resistor
450 CAN gateway
500 sideband communication system
510 first controller card
520 second controller card
605 channel
610 access panel
705 groove
710 track
805 circuit board
810 upstream port
815 downstream port
905 main board
910 secondary board
1005 fastener
1100 data analytics system
1105 data analytics device
1110 data connection
1115 server
1215 memory
1220 clock
1225 thermometer
1230 accelerometer
1300 flowchart
1305 stage
1310 stage
1315 stage
1400 flowchart
1405 stage
1410 stage
1415 stage
1420 stage
1425 stage
1500 flowchart
1505 stage
1510 stage
1515 stage
1600 flowchart
1605 stage
1610 stage
1615 stage
1620 stage
1625 stage
1630 stage
1635 stage
1700 flowchart
1705 stage
1710 stage
1715 stage
1720 stage
1725 stage
1730 stage
1735 stage
1800 flowchart
1805 stage
1810 stage
1815 stage
1820 stage
1825 stage
1830 stage
1835 stage
1840 stage
1900 flowchart
1910 stage
1915 stage
1920 stage
2000 flowchart
2005 stage
2010 stage
2015 stage
2020 stage
2025 stage
2030 stage
2035 stage
2040 stage

What is claimed is:

1. A system, comprising:
a conveyor system including a conveyor;
a data analytics system configured to monitor conveyor status of the conveyor system;
wherein the conveyor system includes a conveyor controller that controls a conveyor zone; and
wherein the conveyor controller is configured to track an item in the conveyor zone without a sensor.

2. The system of claim 1, wherein the conveyor controller includes a controller card.

3. The system of claim 1, wherein the conveyor zone includes a conveyor motor that provides mechanical power for moving one or more items along the conveyor zone, and the conveyor controller is configured to measure an electrical property of the conveyor motor to determine the conveyor status.

4. The system of claim 3, wherein the conveyor motor includes a motorized drive roller.

5. The system of claim 3, wherein the electrical property includes current drawn by the conveyor motor.

6. The system of claim 3, wherein the electrical property of the conveyor motor is indicative of item weight.

7. The system of claim 3, wherein the electrical property of the conveyor motor is indicative of motor wear.

8. The system of claim 3, wherein the electrical property of the conveyor motor is indicative of item jamming.

9. The system of claim 3, wherein the conveyor controller is configured to measure an electrical property of the conveyor motor when idle to determine the conveyor status.

10. The system of claim 1, wherein:
the conveyor controller includes a temperature sensor; and
the data analytics system is configured to generate a heat map based on temperature data from temperature sensor of the conveyor controller.

11. The system of claim 1, wherein the conveyor controller includes an accelerometer configured to measure conveyor equipment vibrations in the conveyor zone.

12. The system of claim 1, wherein:
the conveyor controller includes a clock; and
the clock is configured to measure item travel time in the conveyor zone.

13. The system of claim 12, wherein the clock is configured to measure conveyor motor run time.

14. The system of claim 1, wherein the conveyor zone includes a sensor operatively connected to the conveyor controller to monitor for presence of one or more items in the conveyor zone.

15. The system of claim 14, wherein the sensor includes a photoeye.

16. The system of claim 14, wherein the conveyor controller is configured to communicate with a downstream conveyor controller that controls a downstream conveyor zone.

17. The system of claim 16, wherein the downstream conveyor controller is configured to determine a malfunction in the conveyor system upon detection of an undetected item in the downstream conveyor zone.

18. The system of claim 17, wherein the malfunction includes misalignment of the sensor.

19. The system of claim 17, wherein the malfunction includes item loss.

20. The system of claim 17, wherein the malfunction includes item jamming.

21. The system of claim 17, wherein the malfunction includes equipment malfunction.

22. The system of claim 1, wherein the conveyor controller tracks the item based on an electrical property of a conveyor motor for the conveyor zone.

23. The system of claim 22, wherein the conveyor controller is configured to assign an identifier for the item and transmit the identifier to a downstream conveyor controller.

24. The system of claim 1, wherein:
the data analytics system is configured to generate an alert based on the conveyor status; and
the alert includes a message about one or more changes to the conveyor system.

25. The system of claim 1, wherein:
the data analytics system is configured to generate information for a simulation of the conveyor system; and
the data analytics system is configured to provide a comparison between the simulation and actual implementation of the conveyor system.

26. The system of claim 1, wherein the data analytics system is configured to provide package travel efficiency analytics.

27. A system, comprising:
a conveyor system including a conveyor;
a data analytics system configured to monitor conveyor status of the conveyor system;
wherein the conveyor system includes a conveyor controller that controls a conveyor zone;
wherein the conveyor zone includes a sensor operatively connected to the conveyor controller to monitor for presence of one or more items in the conveyor zone;
wherein the conveyor controller is configured to communicate with a downstream conveyor controller that controls a downstream conveyor zone; and
wherein the downstream conveyor controller is configured to determine a malfunction in the conveyor system upon detection of an undetected item in the downstream conveyor zone.

28. The system of claim 27, wherein the malfunction includes misalignment of the sensor.

29. The system of claim 27, wherein the malfunction includes item loss.

30. The system of claim 27, wherein the malfunction includes item jamming.

31. The system of claim 27, wherein the malfunction includes equipment malfunction.

32. A system, comprising:
a conveyor system including a conveyor;
a data analytics system configured to monitor conveyor status of the conveyor system; and
wherein the data analytics system is configured to provide package travel efficiency analytics.

* * * * *